(12) United States Patent
Lim et al.

(10) Patent No.: US 10,852,468 B2
(45) Date of Patent: Dec. 1, 2020

(54) OPTICAL MEMBER AND DISPLAY APPARATUS INCLUDING THE SAME

(71) Applicant: Samsung Display Co., Ltd., Yongin-si (KR)

(72) Inventors: Taewoo Lim, Cheonan-si (KR); Dongwoo Kim, Seoul (KR); Minsu Kim, Hwaseong-si (KR); Cheonjae Maeng, Suwon-si (KR); Seongyeon Lee, Asan-si (KR); Hongbeom Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/561,494

(22) Filed: Sep. 5, 2019

(65) Prior Publication Data

US 2020/0081174 A1 Mar. 12, 2020

(30) Foreign Application Priority Data

Sep. 10, 2018 (KR) .................. 10-2018-0107618
Mar. 11, 2019 (KR) .................. 10-2019-0027343

(51) Int. Cl.
*F21V 7/04* (2006.01)
*F21V 8/00* (2006.01)
*G02F 1/1368* (2006.01)

(52) U.S. Cl.
CPC ............ *G02B 6/005* (2013.01); *G02F 1/1368* (2013.01)

(58) Field of Classification Search
CPC ................... G02B 6/005; G02F 1/1368; G02F 2001/133614; G02F 11/133617; G02F 2202/36

USPC ......................................................... 362/606
See application file for complete search history.

(56) References Cited

U.S. PATENT DOCUMENTS

| 9,199,842 | B2 | 12/2015 | Dubrow et al. |
| 9,778,409 | B2 | 10/2017 | Park |
| 2013/0264947 | A1* | 10/2013 | Ouderkirk ................ F21V 9/30 315/151 |
| 2014/0233212 | A1 | 8/2014 | Park |
| 2017/0248748 | A1* | 8/2017 | Satake ................... G02B 6/005 |

(Continued)

FOREIGN PATENT DOCUMENTS

| KR | 10-2013-0120486 | 11/2013 |
| KR | 10-2016-0089695 | 7/2016 |

(Continued)

OTHER PUBLICATIONS

Extended European Search Report dated Jan. 13, 2020, issued in European Patent Application No. 19196270.3.

*Primary Examiner* — Ali Alavi
(74) *Attorney, Agent, or Firm* — H.C. Park & Associates, PLC

(57) ABSTRACT

An optical member including a base substrate, a quantum dot layer disposed on the base substrate and having a first top surface including a lower wrinkle, the quantum dot layer including a medium layer and a plurality of quantum dots dispersed in the medium layer, a lower barrier layer disposed between the base substrate and the quantum dot layer, and an upper barrier layer covering the quantum dot layer, in which the upper barrier layer has a second top surface with an upper wrinkle corresponding to the lower wrinkle of the quantum dot layer.

24 Claims, 15 Drawing Sheets

(56) References Cited

U.S. PATENT DOCUMENTS

| | | | |
|---|---|---|---|
| 2017/0277002 A1* | 9/2017 | Yamada | C08K 9/10 |
| 2018/0072949 A1* | 3/2018 | Satake | G02F 1/133621 |
| 2018/0237690 A1* | 8/2018 | Chung | C09D 4/00 |
| 2019/0121194 A1* | 4/2019 | Park | G02F 1/133502 |
| 2019/0310409 A1 | 10/2019 | Lee et al. | |
| 2020/0032137 A1* | 1/2020 | Watano | C09K 11/08 |

FOREIGN PATENT DOCUMENTS

| | | |
|---|---|---|
| KR | 10-1725023 | 4/2017 |
| KR | 10-2019-0118220 | 10/2019 |
| WO | 2013032128 | 3/2013 |

* cited by examiner

OPTICAL MEMBER AND DISPLAY APPARATUS INCLUDING THE SAME

CROSS-REFERENCE TO RELATED APPLICATIONS

This application claims priority from and the benefit of Korean Patent Application No. 10-2018-0107618, filed on Sep. 10, 2018, and Korean Patent Application No. 10-2019-0027343, filed on Mar. 11, 2019, each of which is hereby incorporated by reference for all purposes as if fully set forth herein.

BACKGROUND

Field

Exemplary embodiments of the invention relate generally to an optical member and a display apparatus including the same, and, more specifically, to a highly reliable optical member and a display apparatus including the same.

Discussion of the Background

A display apparatus typically includes a self-luminous display apparatus, a reflective display apparatus, and a transmissive display apparatus. The reflective display apparatus includes a display panel for changing optical transmittance, and a backlight unit for providing light to the display panel. The display panel controls transmittance of light emitted from the backlight unit to display an image.

A display apparatus may include various optical members in the backlight unit to improve optical characteristics of the display apparatus, such as optical efficiency and color reproduction characteristics. Furthermore, in order to meet an increasing demand for a display apparatus having excellent optical characteristics, thin thickness, and high display quality, various optical members may be additionally added in the display apparatus.

The above information disclosed in this Background section is only for understanding of the background of the inventive concepts, and, therefore, it may contain information that does not constitute prior art.

SUMMARY

An optical member constructed according to exemplary embodiments of the invention provides a thin, highly reliable optical member and a display apparatus including the same.

Additional features of the inventive concepts will be set forth in the description which follows, and in part will be apparent from the description, or may be learned by practice of the inventive concepts.

An optical member according to an exemplary embodiment includes a base substrate, a quantum dot layer disposed on the base substrate and having a first top surface including a lower wrinkle, the quantum dot layer including a medium layer and a plurality of quantum dots dispersed in the medium layer, a lower barrier layer disposed between the base substrate and the quantum dot layer, and an upper barrier layer covering the quantum dot layer, in which the upper barrier layer has a second top surface with an upper wrinkle corresponding to the lower wrinkle of the quantum dot layer.

The upper barrier layer may have a uniform thickness on the base substrate.

The quantum dot layer may have a varying thickness on the base substrate.

The upper barrier layer may include an inorganic layer.

The upper wrinkle may be provided in plural on the second top surface, and at least one of the plurality of upper wrinkles may have a curvilinear shape, when viewed in a plan view.

At least two of the upper wrinkles may be connected to each other.

The curvilinear shape may include a closed loop shape.

The upper wrinkles may include a first wrinkle having a first closed loop shape and a second wrinkle having a second closed loop shape different from the first closed loop shape.

The first wrinkle and the second wrinkle may be connected to each other.

Each of the upper wrinkles may have a vertical thickness of about 1 µm or less.

A distance between the upper wrinkles may be less than 100 µm.

The optical member may further include a low refraction layer disposed between the base substrate and the lower barrier layer, and having a refractive index of 1.5 or less.

The base substrate may include a glass substrate.

The optical member may further include a protection layer including an organic material and disposed on the upper barrier layer, in which the protection layer may cover the second top surface and have a flat top surface.

A display apparatus according to another exemplary embodiment includes a light source configured to emit light, an optical member having an incidence surface facing the light source, and a display panel disposed on the optical member and including a plurality of pixels, in which the optical member includes a base substrate including a top surface facing the display panel, a bottom surface opposite to the top surface, and a plurality of side surfaces connecting the top surface to the bottom surface, at least one of the side surfaces including the incidence surface, a lower barrier layer disposed on the base substrate, the lower barrier layer having a flat top surface, an upper barrier layer disposed on the lower barrier layer, the upper barrier layer having a wrinkled top surface with a plurality of wrinkles formed thereon, and a quantum dot layer disposed between the lower barrier layer and the upper barrier layer, the quantum dot layer including a medium layer and a plurality of quantum dots dispersed in the medium layer, in which the wrinkles have a curvilinear shape, when viewed in a plan view.

The wrinkles may include a first wrinkle having a first shape and a second wrinkle having a second shape different from the first shape, when viewed in a plan view.

The first wrinkle and the second wrinkle may be connected to each other.

A top surface of the medium layer may have a wrinkled shape different from a shape of the top surface of the base substrate.

The medium layer may have a non-uniform thickness on the base substrate, and the upper barrier layer may have a uniform thickness on the base substrate.

The upper barrier layer may include an inorganic layer.

The base substrate may include a glass substrate.

The display apparatus may further include a low refraction layer disposed between the base substrate and the quantum dot layer, and may have a refractive index less than 1.5.

The display apparatus may further include a protection layer disposed on the upper barrier layer and covering the top surface of the upper barrier layer, in which the protection layer may have a flat top surface having a shape different from that of the top surface of the upper barrier layer.

The display panel may be bent along an axis extended in one direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
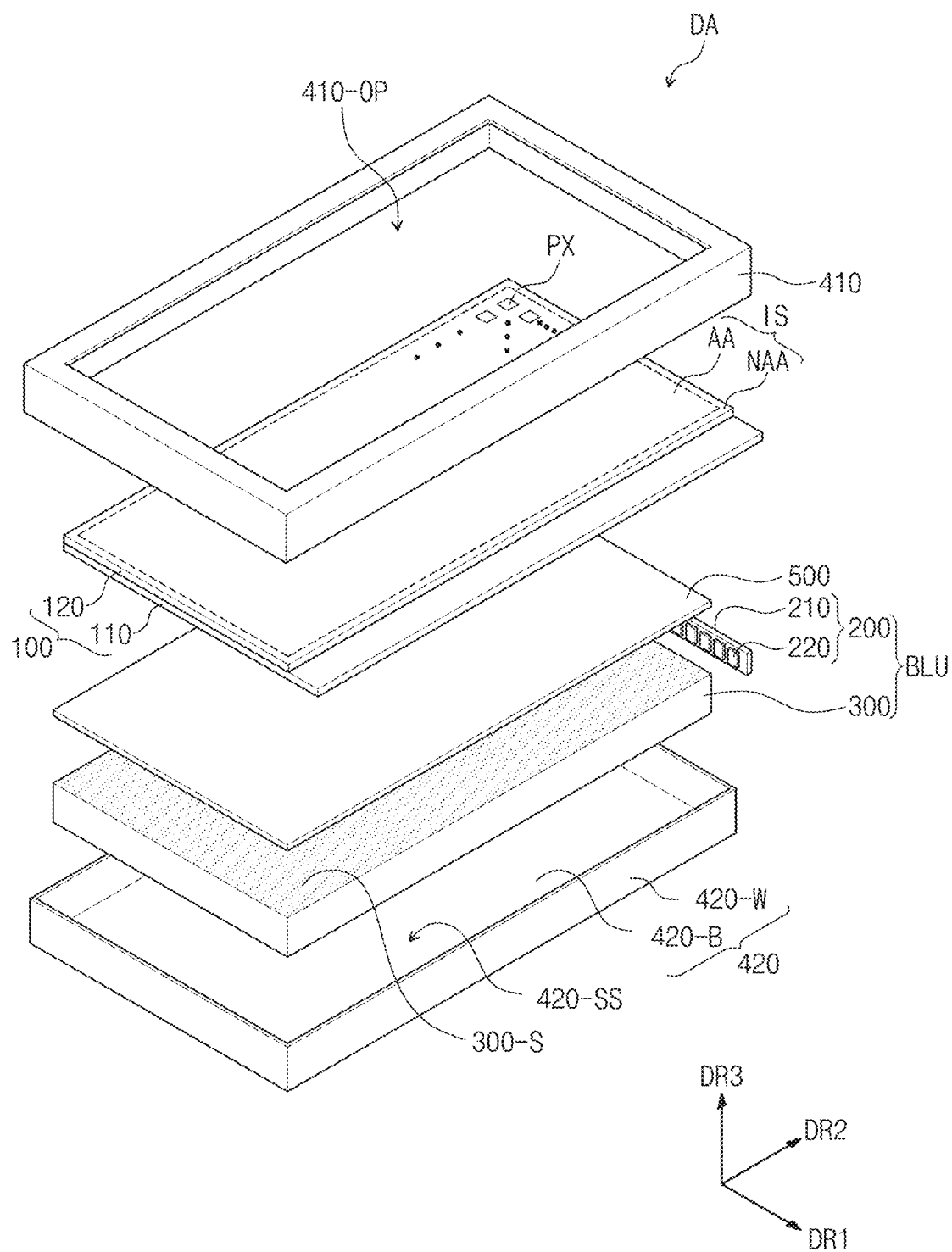
FIG. 1 is an exploded perspective view of a display apparatus according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
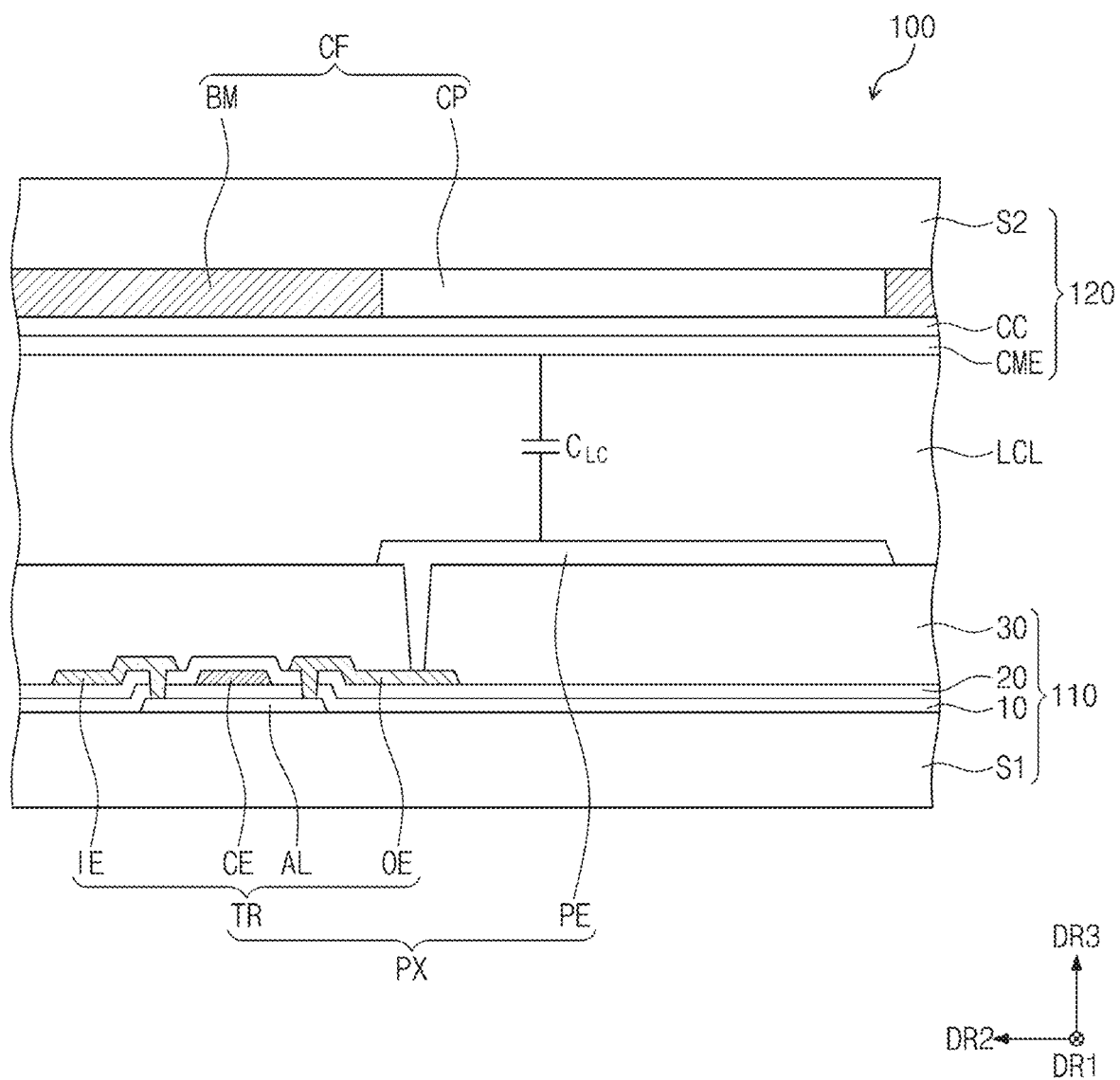
FIG. 2 is a schematic cross-sectional view of the display apparatus of FIG. 1.
Figure 3A:
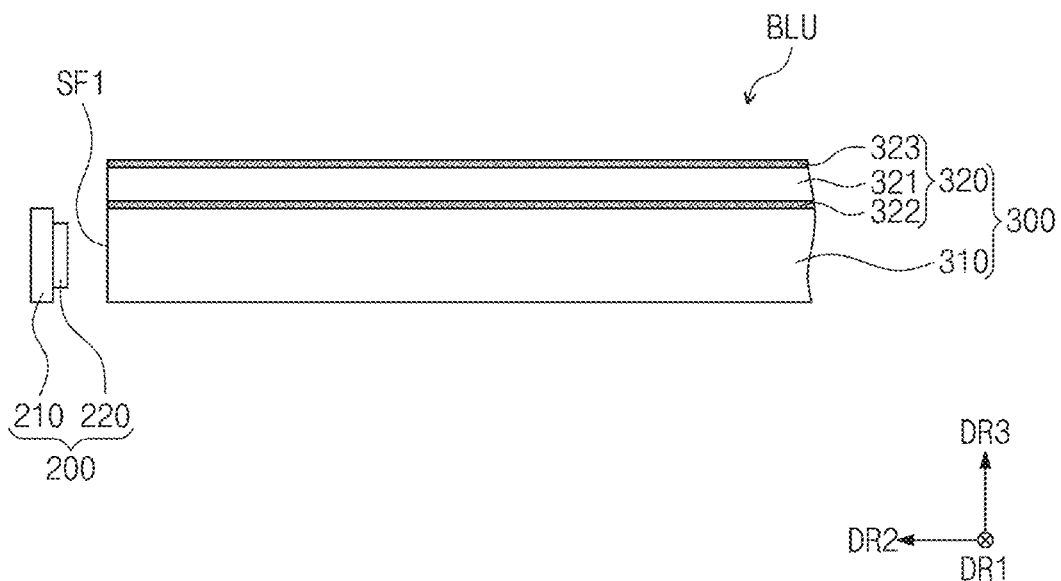
FIG. 3A is a schematic cross-sectional view of a backlight unit according to an exemplary embodiment.
Figure 3B:
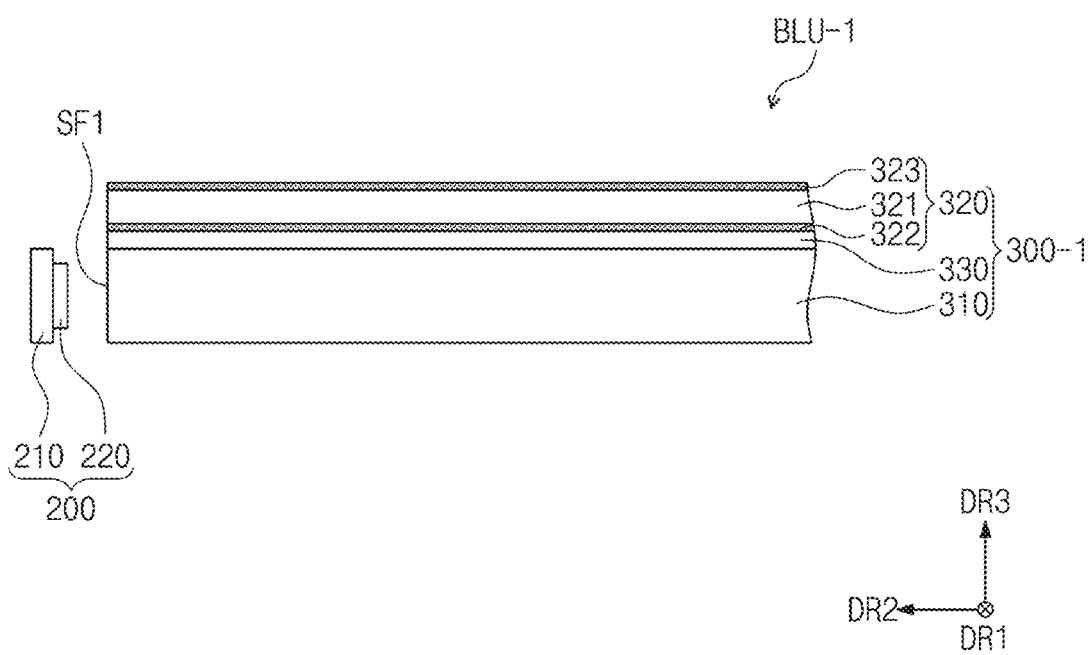
FIG. 3B is a schematic cross-sectional view of a backlight unit according to an exemplary embodiment.

FIG. 1 is an exploded perspective view of a display apparatus according to an exemplary embodiment. FIG. 2 is a schematic cross-sectional view of the display apparatus of FIG. 1. FIG. 3A is a schematic cross-sectional view of a backlight unit according to an exemplary embodiment. FIG. 3B is a schematic cross-sectional view of a backlight unit according to an exemplary embodiment. Hereinafter, a display apparatus according to an exemplary embodiment of the inventive concept will be described with reference to FIGS. 1 to 3B.

As shown in FIG. 1, a display apparatus DA may include a display panel 100, a backlight unit BLU, an upper protection member 410, a lower protection member 420, and an optical film 500. The backlight unit BLU may include a light source 200 and an optical member 300.

The display panel 100 may receive an electrical signal and display an image based on the received electrical signal. A user may receive image information that is provided from the display panel 100 of the display apparatus DA. The display panel 100 may include a display surface IS that is substantially parallel to a plane defined by a first direction DR1 and a second direction DR2. The display surface IS may include an active region AA and a peripheral region NAA. The display panel 100 may display an image on the active region AA that is subsequently perpendicular to a third direction DR3. The active region AA may be selectively activated by the electrical signal. The display panel 100 may include a plurality of pixels PX, which are disposed in the active region AA.

The peripheral region NAA may be adjacent to the active region AA. In an exemplary embodiment, the peripheral region NAA may enclose the active region AA. Various driving circuits providing electrical signals to the pixels PX or pads receiving electrical signals from an external device may be disposed in the peripheral region NAA.

FIG. 2 exemplarily illustrates a region of the display panel 100, in which one pixel PX is disposed. Hereinafter, the display panel 100 will be described with reference to FIG. 2.

The display panel 100 may include a first substrate 110, a second substrate 120, and a liquid crystal layer LCL. The first substrate 110 may include a first base layer S1, a pixel PX, and a plurality of insulating layers 10, 20, and 30. As shown in FIG. 2, the insulating layers 10, 20, and 30 may include a first insulating layer 10, a second insulating layer 20, and a third insulating layer 30, which are sequentially stacked in the third direction DR3.

The first base layer S1 may be formed of or include an insulating material. For example, the first base layer S1 may be formed of or include at least one of glass or plastic materials.

The pixel PX may include a thin film transistor TR and a pixel electrode PE. The thin film transistor TR may include a semiconductor pattern AL, a control electrode CE, an input electrode IE, and an output electrode OE. The semiconductor pattern AL may be disposed between the first base layer S1 and the first insulating layer 10. The semiconductor pattern AL may be formed of or include a semiconductor material. For example, the semiconductor material may include at least one of amorphous silicon, poly silicon, single-crystalline silicon, oxide semiconductors, or compound semiconductors. In some exemplary embodiments, the pixel PX may include a plurality of thin film transistors, whose semiconductor materials are the same as or different from each other, but the inventive concept are not limited thereto.

The control electrode CE may be disposed between the first insulating layer 10 and the second insulating layer 20. The control electrode CE may be spaced apart from the semiconductor pattern AL with the first insulating layer 10 interposed therebetween.

The input electrode IE and the output electrode OE may be disposed between the second insulating layer 20 and the third insulating layer 30. The input electrode IE and the output electrode OE may be spaced apart from each other. Each of the input and output electrodes IE and OE may penetrate the first insulating layer 10 and the second insulating layer 20, and may be coupled to the semiconductor pattern AL.

The pixel electrode PE may be connected to the thin film transistor TR. The pixel electrode PE, a common electrode CME, and the liquid crystal layer LCL may form a liquid crystal capacitor CLC. In the liquid crystal capacitor CLC, an electric field produced between the pixel electrode PE and the common electrode CME may be used to control the orientation of liquid crystal molecules in the liquid crystal layer LCL, and thus, control the optical transmittance of the liquid crystal layer LCL. An intensity of light emitted from the pixel PX may be determined by the optical transmittance of the liquid crystal layer LCL.

The pixel electrode PE may be disposed on the third insulating layer 30. The pixel electrode PE may penetrate the third insulating layer 30 and may be coupled to the thin film transistor TR. If a gate signal of the electrical signals is applied to the control electrode CE, the thin film transistor TR may be turned on, and in this case, if a data signal of the electrical signals is applied to the input electrode IE, the data signal may be transferred to the output electrode OE and the pixel electrode PE through the thin film transistor TR in the turned-on state.

The second substrate 120 may include a second base layer S2, a color filter layer CF, an over-coat layer CC, and the common electrode CME. The second base layer S2 may be formed of or include an insulating material. The second base layer S2 may be formed of or include at least one of, for example, glass or plastic materials.

The second base layer S2 may include a rear surface facing the first base layer S1 and a front surface facing the rear surface. At least a portion of the front surface may be used as the display surface IS (e.g., see FIG. 1). The color filter layer CF and the common electrode CME may be disposed on the rear surface of the second base layer S2.

The color filter layer CF may include a black matrix BM and a color pattern CP. The black matrix BM may block light that is incident on the black matrix BM. For example, the black matrix BM may cover a region around pixel regions displaying light, thereby defining the pixel regions and preventing light from being leaked through the region around the pixel regions.

The color pattern CP may be disposed adjacent to the black matrix BM. The color pattern CP may be overlapped with the pixel electrode PE of the pixel PX. In an exemplary embodiment, a plurality of the color patterns CP may be provided on the pixel regions, respectively. Each of the pixel regions may be a region that is controlled by the liquid crystal capacitor CLC and corresponds to the pixel electrode PE.

The color pattern CP may allow light passing therethrough to have a specific wavelength or color. The color pattern CP may include at least one of dye, pigment, organic fluorescent materials, and inorganic fluorescent materials. In an exemplary embodiment, the color filter layer CF may be disposed on the first base layer S1 to form the first substrate 110. Alternatively, in some exemplary embodiments, the color filter layer CF may be omitted. The shape of the color filter layer CF may be variously changed, and the inventive concepts are not limited to a specific shape of the color filter layer CF.

The over-coat layer CC may cover the color filter layer CF. The over-coat layer CC may be formed of or include an insulating material. The over-coat layer CC may cover a rear surface of the color filter layer CF and may provide a flat surface to the common electrode CME. In some exemplary embodiments, the over-coat layer CC may be omitted from the display panel 100.

The common electrode CME may produce an electric field along with the pixel electrode PE. In the illustrated exemplary embodiment, the common electrode CME may be disposed on a rear surface of the second base layer S2, and may be formed over a plurality of pixels. However, the inventive concepts are not limited thereto, and in some exemplary embodiments, the common electrode CME may formed as a plurality of patterns, which are respectively provided on the pixel regions. In other exemplary embodiments, the common electrode CME may be disposed on the first base layer S1 to form the first substrate 110. FIG. 2 shows that the pixel electrode PE has a slit-free shape, however, in some exemplary embodiments, at least one of the common electrode CME and the pixel electrode PE of the display panel 100 may be provided to have a plurality of slits.

The liquid crystal layer LCL may include liquid crystal molecules. The liquid crystal molecules may have a chemical structure whose orientation can be controlled by an electric field produced between the pixel electrode PE and the common electrode CME. Optical transmittance of the liquid crystal layer LCL may be substantially controlled by the orientation of the liquid crystal molecules.

A schematic cross-sectional view of the backlight unit BLU of FIG. 1 is illustrated in FIG. 3A. According to an exemplary embodiment, a backlight unit BLU-1 may further include additional elements, as shown in FIG. 3B. First, the backlight unit BLU will be described with reference to FIGS. 1 and 3A.

The backlight unit BLU may provide light to the display panel 100. The display panel 100 may control the transmittance of light in each of the pixels PX to display an image. In an exemplary embodiment, the display panel 100 may be a transmissive-type display panel.

The light source 200 may generate light, and provide light to the optical member 300 in a lateral direction. The light source 200 may include a circuit substrate 210 and a plurality of light-emitting elements 220. The circuit substrate 210 may be a plate-shaped structure elongated in the first direction DR1, and may have a length and a width that are respectively measured in the first and third directions DR1 and DR3. The circuit substrate 210 may include an insulating substrate and circuit lines mounted on the insulating substrate. The circuit lines may be used to transfer electrical signals from the outside to the light-emitting elements 220, or to connect the light-emitting elements 220 electrically to each other.

Each of the light-emitting elements 220 may generate light. The light-emitting elements 220 may be disposed on the circuit substrate 210 and may be electrically connected to the circuit substrate 210. The light-emitting elements 220 may be spaced apart from each other in a length direction of the circuit substrate 210. As shown in FIG. 1, the light-emitting elements 220 according to an exemplary embodiment may be arranged to form a single row in the first direction DR1.

The optical member 300 may be a plate-shaped element that is disposed substantially parallel to the display panel 100. The optical member 300 may be disposed, such that a top surface 300-S thereof (see FIG. 1) faces the display panel 100.

The optical member 300 may receive light from the light source 200 and provide light to the display panel 100. The optical member 300 may control a propagation path of light emitted from the light source 200, such that light may be uniformly incident onto the display panel 100.

In an exemplary embodiment, the optical member 300 may convert an incident light to a white light. In this case, even if the light source 200 generates a non-white (e.g., blue) light, light provided to the display panel 100 through the optical member 300 may be white. More particularly, the optical member 300 may function as a light guide plate and a light conversion member. In this case, the optical member 300 provided as a single structure may be used to replace both of the light guide plate and the light conversion member, which may reduce a total thickness of the display apparatus DA and simplify a process of assembling the display apparatus DA.

The optical member 300 may include a base substrate 310 and a quantum dot unit 320. The base substrate 310 may include an incidence surface SF1 facing the light source 200. As shown in FIG. 3A, one of side surfaces of the base substrate 310 may be used as the incidence surface SF1, but the inventive concepts are not limited thereto. For example, at least two of the side surfaces of the base substrate 310 may be used as the incidence surface SF1.

The base substrate 310 may be formed of or include an insulating material. For example, the base substrate 310 may be formed of or include glass.

The base substrate 310 may be configured to allow light, which is incident through the incidence surface SF1, to propagate toward a top surface of the base substrate 310. For example, the incident light may propagate along an initial path substantially parallel to the second direction DR2, and the third base substrate 310 may change the propagation path along a direction substantially parallel to the third direction DR3. The light guiding function of the optical member 300 may be substantially achieved by the base substrate 310.

The quantum dot unit 320 may be disposed on the base substrate 310. The quantum dot unit 320 may include a quantum dot layer 321, a lower barrier layer 322, and an upper barrier layer 323. The quantum dot layer 321 may include a plurality of quantum dots. The quantum dot layer 321 may change a wavelength of light incident thereto.

The lower barrier layer 322 and the upper barrier layer 323 may seal the quantum dot layer 321. The lower barrier layer 322 may be disposed between the quantum dot layer 321 and the base substrate 310 to protect the quantum dot layer 321 from an underlying element, and to prevent external moisture or water from entering the quantum dot layer 321. The upper barrier layer 323 may be disposed on the quantum dot layer 321 to cover a top surface of the quantum dot layer 321. The upper barrier layer 323 may protect the quantum dot layer 321 from an element thereon, and prevent external moisture or water from entering the quantum dot layer 321.

Each of the lower and upper barrier layers 322 and 323 may be formed of or include an inorganic material. For example, each of the lower and upper barrier layers 322 and 323 may include at least one of metal oxides or metal nitrides. More particularly, each of the lower and upper barrier layers 322 and 323 may be formed of or include at least one of silicon oxide, silicon nitride, silicon oxynitride, titanium oxide, or any combination thereof. However, the inventive concepts are not limited thereto, and various inorganic materials may be used as at least one of the lower and upper barrier layers 322 and 323, as long as the lower and upper barrier layers 322 and 323 to seal the quantum dot layer 321. In an exemplary embodiment, the lower and upper barrier layers 322 and 323 may be formed independently. Accordingly, the lower and upper barrier layers 322 and 323 may be formed of or include the same material or different materials.

In FIG. 3A, the lower and upper barrier layers 322 and 323 are illustrated as exposing side surfaces of the quantum dot layer 321. However, the inventive concepts are not limited thereto, and in some exemplary embodiments, the side surfaces of the quantum dot layer 321 may be covered with at least one of the lower and upper barrier layers 322 and 323, and may not be exposed to the outside.

Now, referring to FIG. 3B, the backlight unit BLU-1 may further include a low refraction layer 330. The low refraction layer 330 may be disposed between the base substrate 310 and the quantum dot unit 320. The low refraction layer 330 may cover a top surface of the base substrate 310.

The low refraction layer 330 may have a refractive index lower than that of the base substrate 310. For example, the low refraction layer 330 may have a refractive index lower than about 1.5. The low refraction layer 330 may improve the light guiding property of the base substrate 310.

Referring back to FIG. 1, the upper protection member 410 may be disposed on the display panel 100 to cover the display panel 100. The upper protection member 410 may include an opening 410-OP exposing at least a portion of the display panel 100. For example, the opening 410-OP may expose at least the active region AA of the display panel 100, such that a user may recognize a portion (e.g., passing through the opening 410-OP) of an image displayed on the active region AA. In an exemplary embodiment, the display apparatus DA may further include a transparent protection member that is disposed in the opening 410-OP. Alternatively, the upper protection member 410 may be optically transparent. In this case, the opening 410-OP may be omitted.

The lower protection member 420 may be combined with the upper protection member 410 to protect the display panel 100 and the backlight unit BLU. The lower protection member 420 may include a bottom portion 420-B and a sidewall portion 420-W. The bottom portion 420-B may have an area that is equal or greater than that of the display panel or and the optical member 300. The sidewall portion 420-W may be connected to the bottom portion 420-B, and may be bent from the bottom portion 420-B substantially in the third direction DR3. The bottom portion 420-B and the sidewall portion 420-W may define an internal space 420-SS. The display panel 100 and the backlight unit BLU may be disposed in the internal space 420-SS and may be protected from an external impact.

The optical film 500 may be disposed between the display panel 100 and the optical member 300. The optical film 500 may be configured to allow light, which is emitted from the optical member 300, to be incident to the display panel 100 with improved efficiency or improved spatial uniformity. The optical film 500 may include a single sheet or a plurality of sheets. For example, the optical film 500 may include at least one of a reticular sheet, a prism sheet, and a scattering sheet. In some exemplary embodiments, the optical film 500 may be omitted from the display apparatus DA.

Figure 4:
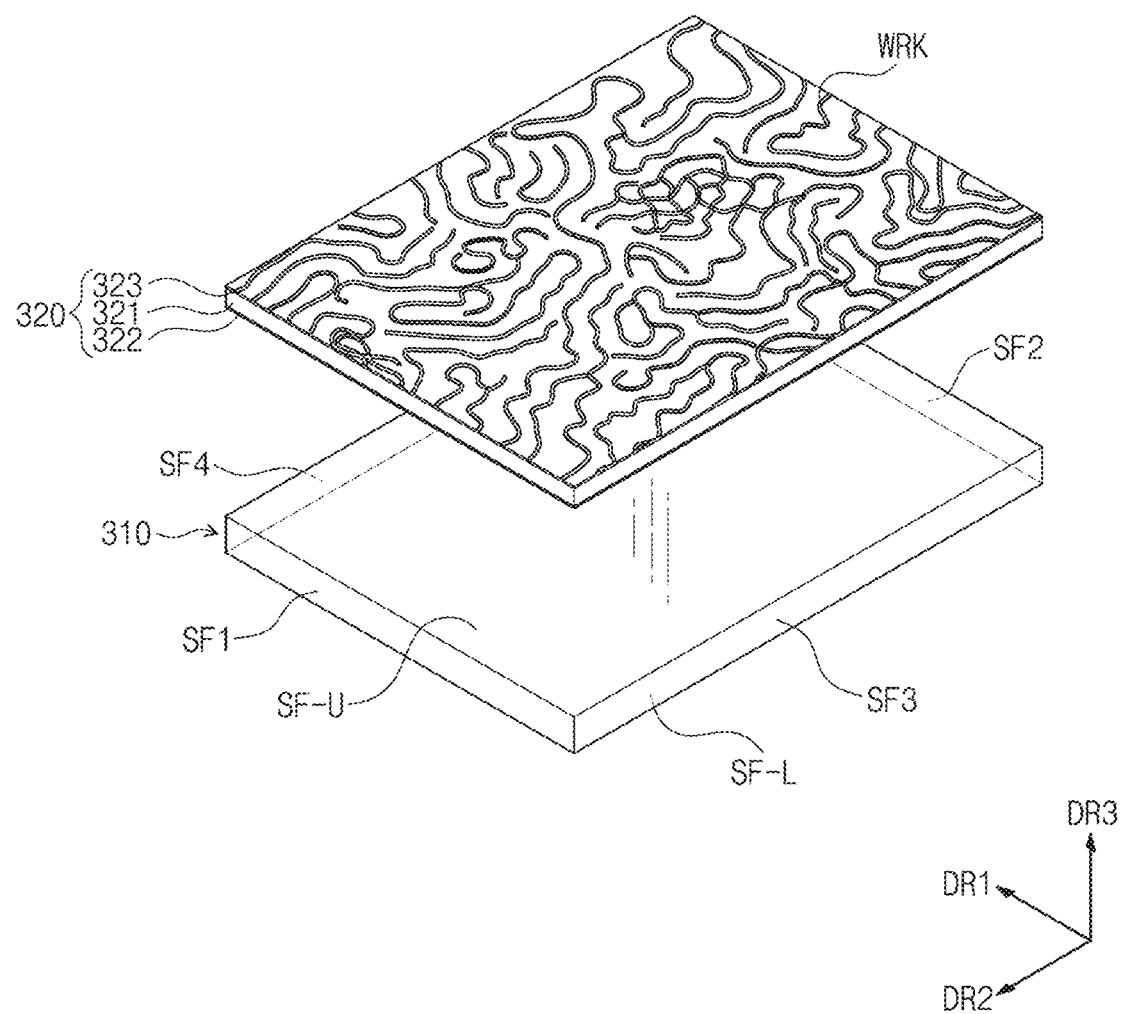
FIG. 4 is an exploded perspective view of an optical member according to an exemplary embodiment.
Figure 5A:
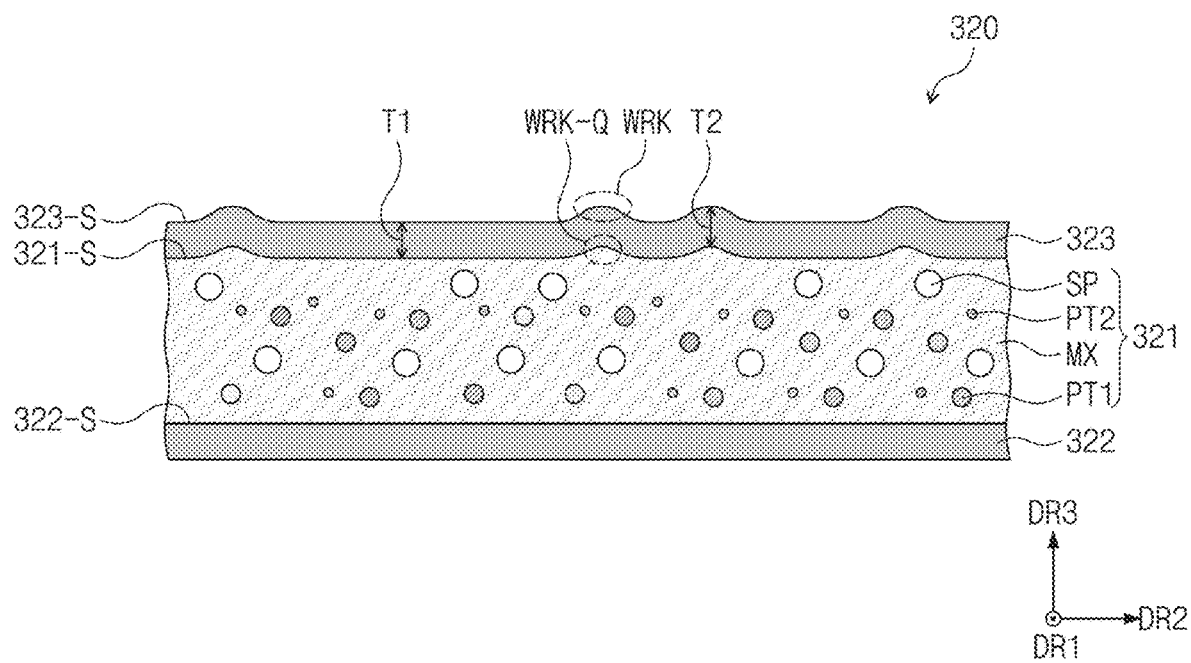
FIG. 5A is a cross-sectional view of a portion of an optical member according to an exemplary embodiment.
Figure 5B:
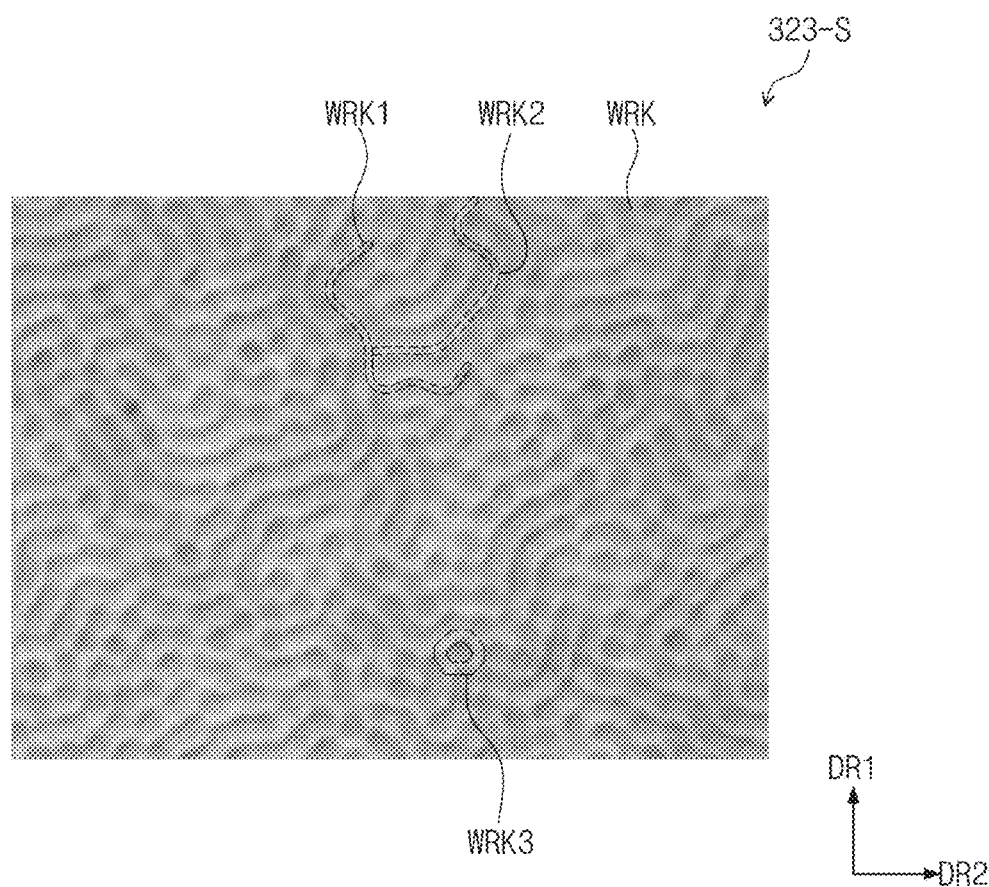
FIG. 5B is an image showing a portion of an optical member according to an exemplary embodiment.

FIG. 4 is an exploded perspective view illustrating an optical member according to an exemplary embodiment. FIG. 5A is a cross-sectional view illustrating a portion of an optical member according to an exemplary embodiment. FIG. 5B is an image showing a portion of an optical member according to an exemplary embodiment. For convenience in illustration, the base substrate 310 and the quantum dot unit 320 are separately illustrated in FIG. 4. A region of the quantum dot unit 320 of FIG. 4 is illustrated in FIG. 5A. Hereinafter, an optical member according to an exemplary embodiment will be described with reference to FIGS. 4 to 5B.

The base substrate 310 may include a top surface SF-U, a bottom surface SF-L, and a plurality of side surfaces SF1, SF2, SF3, and SF4. The base substrate 310 may be disposed, such that the top surface SF-U faces the display panel 100 (e.g., see FIG. 1). The quantum dot unit 320 may be disposed on the top surface SF-U. The bottom surface SF-L opposite to the top surface SF-U may be a surface facing the bottom portion 420-B of the lower protection member 420 (e.g., see FIG. 1).

The side surfaces SF1, SF2, SF3, and SF4 may include a first side surface SF1, a second side surface SF2, a third side surface SF3, and a fourth side surface SF4. Each of the first and second side surfaces SF1 and SF2 may be substantially parallel to a plane defined by the first and third directions DR1 and DR3, and may face each other in the second direction DR2. Each of the third and fourth side surfaces SF3 and SF4 may be substantially parallel to a plane defined by the second and third directions DR2 and DR3, and may face each other in the first direction DR1.

As described above, at least one of the side surfaces SF1, SF2, SF3, and SF4 may be placed to face the light source 200 (e.g., see FIG. 1) and may be used as an incidence surface. Hereinafter, the first side surface SF1 will be described as being the incidence surface.

The quantum dot unit 320 may include the lower barrier layer 322, the quantum dot layer 321, and the upper barrier layer 323, which are stacked in the third direction DR3. The lower barrier layer 322 may be disposed over the base substrate 310. A top surface 322-S of the lower barrier layer 322 (hereinafter, a "LBL top surface") may have a shape corresponding to that of a top surface of the base substrate 310 disposed thereunder. In the illustrated exemplary embodiment, the LBL top surface 322-S may be substantially flat, compared to a top surface 323-S of the upper barrier layer 323 (hereinafter, a "UBL top surface").

The quantum dot layer 321 may include a medium layer MX, a plurality of quantum dots PT1 and PT2, and a scattering particle SP. The quantum dots PT1 and PT2 and the scattering particle SP may be dispersed in the medium layer MX.

The medium layer MX may be formed of various resin compositions typically called binders. For example, the medium layer MX may be formed of or include a polymer resin. More particularly, the medium layer MX may be formed of or include at least one of acrylic resin, urethane resin, silicone resin, and epoxy resin. The medium layer MX may be an optically transparent resin. However, the inventive concepts are not limited thereto, and any elements capable of dispersing the quantum dots PT1 and PT2 therein may be used as the medium layer MX.

The quantum dots PT1 and PT2 may change a wavelength of light incident thereon. Each of the quantum dots PT1 and PT2 may have a nanometer-order crystalline material including hundreds to thousands of atoms. Due to the size of the quantum dots PT1 and PT2, the quantum dots PT1 and PT2 may exhibit an increase in band gap caused by the quantum confinement effect. When an energy of light incident to the quantum dots PT1 and PT2 is greater than a band gap of each of the quantum dots PT1 and PT2, each of the quantum dots PT1 and PT2 may absorb the light to have an excited state, and each of the quantum dots PT1 and PT2 may emit light with a specific wavelength, when it returns to its ground state. The wavelength of the emitted light may be determined by the band gap. As such, a size or composition of each of the quantum dots PT1 and PT2 may be controlled to adjust the quantum confinement effect, which affects optical characteristics (e.g., wavelength) of light to be emitted from the quantum dots PT1 and PT2.

Each of the quantum dots PT1 and PT2 may be selected from the group consisting of II-VI compounds, III-V compounds, IV-VI compounds, IV elements, IV compounds, and combination thereof.

The II-VI compounds may be selected from the group consisting of binary compounds (e.g., CdS, CdSe, CdTe, ZnS, ZnSe, ZnTe, ZnO, HgS, HgSe, HgTe, MgSe, and MgS), mixtures of the binary compounds, ternary compounds (e.g., CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, and MgZnS), mixtures of the ternary compounds, quaternary compounds (e.g., HgZnTeS, CdZnSeS, CdZnSeTe, CdZnSTe, CdHgSeS, CdHgSeTe, CdHgSTe, HgZnSeS, HgZnSeTe, and HgZnSTe), and mixtures of the quaternary compounds.

The III-V compounds may be selected from the group consisting of binary compounds (e.g., GaN, GaP, GaAs, GaSb, AN, AlP, AlAs, AlSb, InN, InP, InAs, and InSb), mixtures of the binary compounds, ternary compounds (e.g., GaNP, GaNAs, GaNSb, GaPAs, GaPSb, AlNP, AlNAs, AlNSb, AlPAs, AlPSb, InNP, InNAs, InNSb, InPAs, InPSb, and GaAlNP), mixtures of the ternary compounds, quaternary compounds (e.g., GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, and InAlPSb), and mixtures of the quaternary compounds. The IV-VI compounds may be selected from the group consisting of binary compounds (e.g., SnS, SnSe, SnTe, PbS, PbSe, and PbTe), mixtures of the binary compounds, ternary compounds (e.g., SnSeS, SnSeTe, SnSTe, PbSeS, PbSeTe, PbSTe, SnPbS, SnPbSe, and SnPbTe), mixtures of the ternary compounds, quaternary compounds (e.g., SnPbSSe, SnPbSeTe, and SnPbSTe), and mixtures of the quaternary compounds. The IV elements may be selected from the group consisting of Si, Ge, and mixtures thereof. The IV compounds may include binary compounds selected from the group consisting of SiC, SiGe, and mixtures thereof.

Here, the binary, ternary, or quaternary compound may have a uniform concentration throughout the particle, or may have a spatially varying concentration distribution in each particle.

Each of the quantum dots PT1 and PT2 may have a core-shell structure including a core and a shell enclosing the core. In some exemplary embodiments, each of the quantum dots PT1 and PT2 may have a core/shell structure, in which one quantum dot is enclosed by another quantum dot. At an interface between the core and the shell, an element contained in the shell may have a gradually decreasing concentration towards a central direction.

Each of the quantum dots PT1 and PT2 may be a nanometer-scale particle. Each of the quantum dots PT1 and PT2 may have a light-emitting wavelength spectrum, whose full width half maximum (FWHM) is less than about 45 nm, and in some exemplary embodiments, less than about 40 nm, and in some other exemplary embodiments, less than about 30 nm. In this case, the quantum dots PT1 and PT2 may improve color purity or color reproduction characteristics. Furthermore, the quantum dots PT1 and PT2 may emit light radially, which may improve a viewing angle.

In an exemplary embodiment, the quantum dots PT1 and PT2 may be a substantially spherical, pyramid-shaped, multi-arm, or cubic nano particle. In another exemplary embodiment, the quantum dots PT1 and PT2 may be a nano tube, a nano wire, a nano fiber, a nano plate-shaped particle, but the inventive concepts are not limited thereto.

In the illustrated exemplary embodiment, the quantum dots PT1 and PT2 may include a first quantum dot PT1 and a second quantum dot PT2. Wavelengths of lights incident onto the first quantum dot PT1 and the second quantum dot PT2 and emitted therefrom may be different from each other.

However, the inventive concepts are not limited thereto, and in some exemplary embodiments, wavelengths of light converted by the quantum dots PT1 and PT2 may be within a single wavelength range. In addition, in an exemplary embodiment, the quantum dots PT1 and PT2 may further include an additional quantum dot converting other wavelength of light. However, the inventive concepts are not limited thereto, and the type or the numbers of the quantum dots PT1 and PT2 may be variously changed.

The scattering particle SP may include nanoparticles that are formed of at least one of highly reflective metal oxide, such as titanium oxide, or silica-based materials. The scattering particle SP may scatter light emitted from the quantum dots PT1 and PT2 to improve an optical recycling efficiency in the quantum dot unit 320. As such, the optical efficiency of light emitted from the quantum dot unit 320 may be improved. However, the inventive concepts are not limited thereto, and in some exemplary embodiments, the scattering particle SP may be omitted from the quantum dot unit 320.

In the illustrated exemplary embodiment, a top surface 321-S of the quantum dot layer 321 (hereinafter, a "QDL top surface") may include a plurality of wrinkles or concavo-convex patterns WRK-Q (hereinafter, "QDL wrinkles"). The QDL wrinkles WRK-Q may be portions of the QDL top surface 321-S, which protrude substantially in the third direction DR3 as compared to a plane defined by the first direction DR1 and the second direction DR2. The QDL wrinkles WRK-Q may have a thickness of about 1 µm or less, when measured in a vertical direction. As such, the QDL top surface 321-S may be uneven as compared to the LBL top surface 322-S.

The QDL wrinkles WRK-Q may be formed by a residual stress, which may occur or remain in the quantum dot layer 321 during or after the formation of the quantum dot layer 321. Due to the presence of the QDL wrinkles WRK-Q, the QDL top surface 321-S may have a wrinkled shape. The uneven shape of the QDL wrinkles WRK-Q may be transcribed to the top surface of the upper barrier layer 323. The will be described in more detail below.

The upper barrier layer 323 may be disposed on the quantum dot layer 321 to directly cover the QDL top surface 321-S. The upper barrier layer 323 may have a substantially uniform thickness on the base substrate 310. For example, the upper barrier layer 323 may have a thickness T2 in a region of the QDL top surface 321-S overlapped with the QDL wrinkles WRK-Q, and a thickness T1, which is substantially equal to T1, in a region of the QDL top surface 321-S adjacent to the QDL wrinkles WRK-Q.

In the illustrated exemplary embodiment, the top surface 323-S of the upper barrier layer 323 (e.g., the UBL top surface) may define the top surface 300-S of the optical member (e.g., see FIG. 1). The UBL top surface 323-S may have a shape corresponding to that of the QDL top surface 321-S disposed thereunder. As such, the UBL top surface 323-S may include a plurality of wrinkles WRK corresponding to the QDL wrinkles WRK-Q. The wrinkles WRK may be portions of the UBL top surface 323-S, which protrude substantially in the third direction DR3 as compared to a plane defined by the first direction DR1 and the second direction DR2. Due to the presence of the wrinkles WRK, the UBL top surface 323-S may have an uneven section as compared to the top surface SF-U of the base substrate 310. For example, due to the presence of the wrinkles WRK, the UBL top surface 323-S may have a wrinkled shape.

FIG. 5B is an image showing an enlarged shape of a region of the UBL top surface 323-S. Referring to FIG. 5B, the wrinkles WRK may be randomly arranged on the top surface SF-U of the base substrate 310.

At least one of the wrinkles WRK may have a substantially curvilinear shape when viewed in a plan view. The curvilinear shape may refer to a shape having at least a curved or bent portion, and may include open or close curvilinear shapes. In FIG. 5B, for convenience in illustration, only some of the wrinkles WRK (e.g., a first wrinkle WRK1, a second wrinkle WRK2, and a third wrinkle WRK3) are indicated with reference numerals.

The first wrinkle WRK1 may have a curvilinear shape when viewed in a plan view. For example, the first wrinkle WRK1 may have a non-closed (e.g., open) curvilinear shape. The second wrinkle WRK2 may have a curvilinear shape when viewed in a plan view. For example, the second wrinkle WRK2 may have an open curvilinear shape.

The first wrinkle WRK1 and the second wrinkle WRK2 may have shapes that are independent from each other. In particular, the curvilinear shape of the first wrinkle WRK1 and the curvilinear shape of the second wrinkle WRK2 may be the same as or different from each other, because they are independently controlled. In the illustrated exemplary embodiment, the first wrinkle WRK1 and the second wrinkle WRK2 are illustrated to have curvilinear shapes different from each other.

The first wrinkle WRK1 and the second wrinkle WRK2 may be connected to each other. In the illustrated exemplary embodiment, an end of the second wrinkle WRK2 is connected to a portion of the first wrinkle WRK1. However, the inventive concepts are not limited thereto. For example, in some exemplary embodiments, the first wrinkle WRK1 and the second wrinkle WRK2 may be connected to each other at other position or may be separated from each other.

The third wrinkle WRK3 may be spaced apart from the first wrinkle WRK1 and the second wrinkle WRK2. The third wrinkle WRK3 may have a curvilinear shape. The curvilinear shape of the third wrinkle WRK3 may be a closed loop shape.

According to an exemplary embodiment, the wrinkles WRK may have various shapes when viewed in a plan view. As described above, some of the wrinkles WRK may be connected to each other, or may be separated or spaced apart from each other. In addition, some of the wrinkles WRK may be a non-closed (e.g., open) curvilinear shape or a closed curvilinear shape. In an exemplary embodiment, a distance between the wrinkles WRK may be equal to or less than about 100 µm.

In an exemplary embodiment, the upper barrier layer 323 may include an uneven top surface 323-S with a plurality of the wrinkles WRK. The wrinkles WRK may be formed from substantially the uneven profile of the QDL top surface 321-S. In an exemplary embodiment, even when the quantum dot layer 321 is deformed by an external impact or a change in temperature, since the upper barrier layer 323 is formed along the QDL wrinkles WRK-Q, the upper barrier layer 323 may reduce various technical stress caused by the deformation of the quantum dot layer 321. As such, the upper barrier layer 323 may be suppressed or prevented from being damaged (e.g., delaminated from the quantum dot layer 321 or being broken), and thus, the reliability of the optical member 300 may be improved.

Figure 6A:
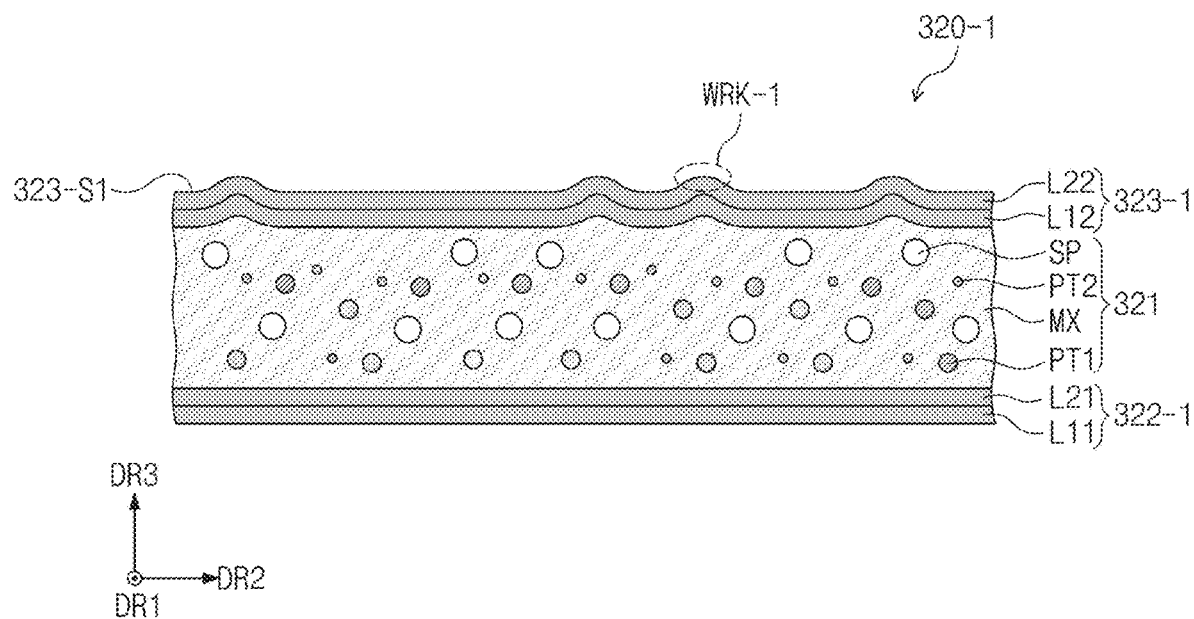
FIG. 6A is a cross-sectional view of a portion of an optical member according to an exemplary embodiment.
Figure 6B:
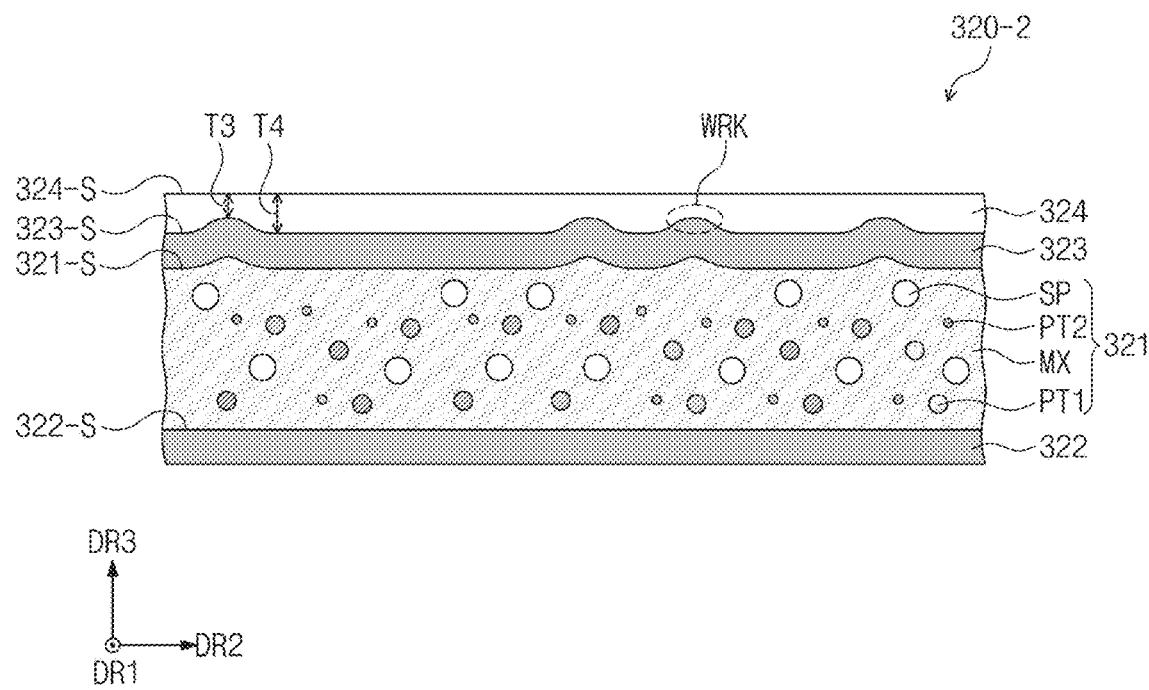
FIG. 6B is a cross-sectional view of a portion of an optical member according to an exemplary embodiment.

FIG. 6A is a cross-sectional view of a portion of an optical member according to an exemplary embodiment. FIG. 6B is a cross-sectional view of an optical member according to an exemplary embodiment. Some regions of quantum dot units 320-1 and 320-2 are illustrated in the cross-sectional views of FIGS. 6A and 6B. Hereinafter, an optical member according to exemplary embodiments will be described with reference to FIGS. 6A and 6B, which may include substantially the same elements previously described with reference to FIGS. 1 to 5B. As such, repeated descriptions of the substantially the same elements will be omitted to avoid redundancy.

As shown in FIG. 6A, the quantum dot unit 320-1 may include a lower barrier layer 322-1 with a plurality of layers, and an upper barrier layer 323-1 with a plurality of layers. The lower barrier layer 322-1 may include a first lower layer L11 and a second lower layer L21. Each of the first lower layer L11 and the second lower layer L21 may be formed of or include an inorganic material. For example, each of the first lower layer L11 and the second lower layer L21 may be formed of or include at least one of metal oxides, silicon oxide, silicon nitride, or any combination thereof. The materials of the first and second lower layers L11 and L21 may be the same as or different from each other without being limited thereto.

The upper barrier layer 323-1 may include a first upper layer L12 and a second upper layer L22. Each of the first upper layer L12 and the second upper layer L22 may be formed of or include an inorganic material. The materials of the first and second upper layers L12 and L22 may be the same as or different from each other without being limited thereto.

As shown in FIG. 6B, the quantum dot unit 320-2 may further include a cover layer 324 as compared to the quantum dot unit 320 of FIG. 5A. The cover layer 324 may be disposed on the upper barrier layer 323 to cover the UBL top surface 323-S. In this case, the top surface 300-S of the optical member of FIG. 1 may correspond to a top surface of the cover layer 324.

The cover layer 324 may cover the wrinkles WRK and provide a substantially flat top surface on the quantum dot unit 320-2. As such, in the cover layer 324, a thickness T3 of a portion overlapped with the wrinkles WRK may be different from a thickness T4 of a portion adjacent to the wrinkles WRK.

The cover layer 324 may be formed of or include an organic material. The cover layer 324 may be optically transparent. Due to the transparency of the cover layer 324, the efficiency of light emitted from the quantum dot unit 320-2 may not be deteriorated.

Figure 7A:
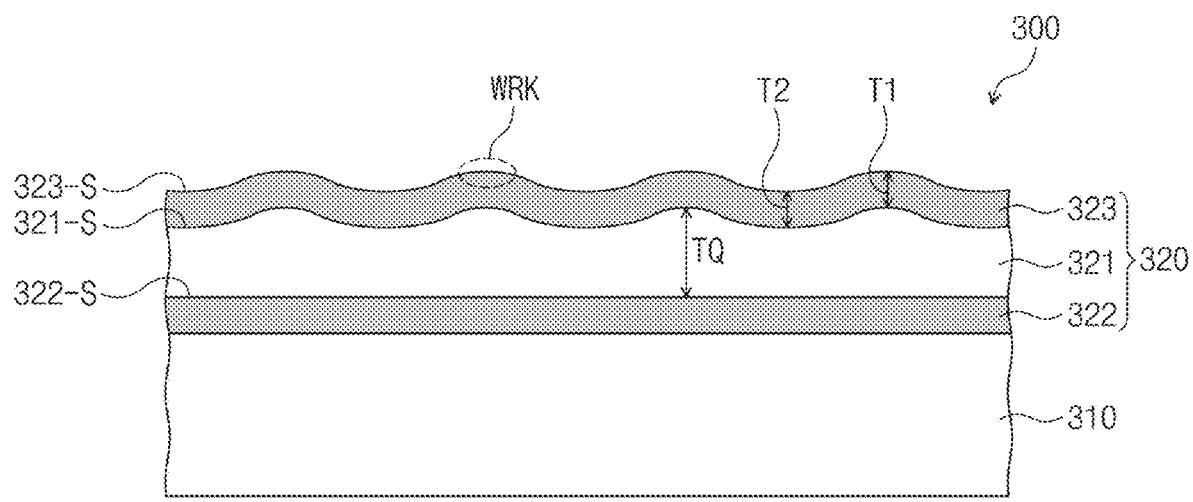
FIGS. 7A, 7B, and 7C are cross-sectional views of an optical member according to exemplary embodiments.
Figure 7B:
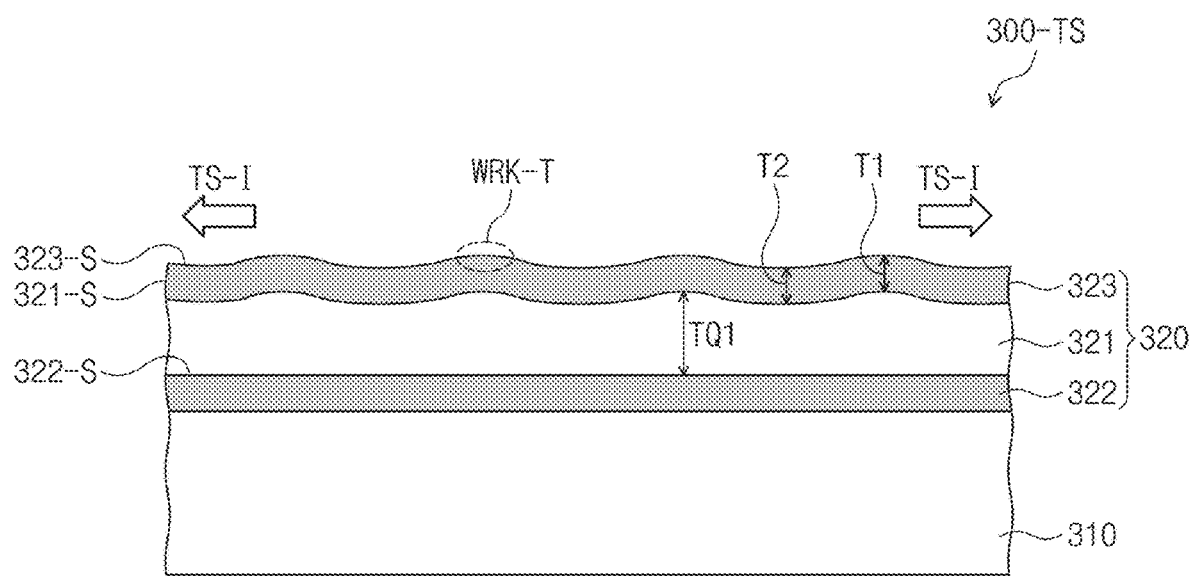
Figure 7C:
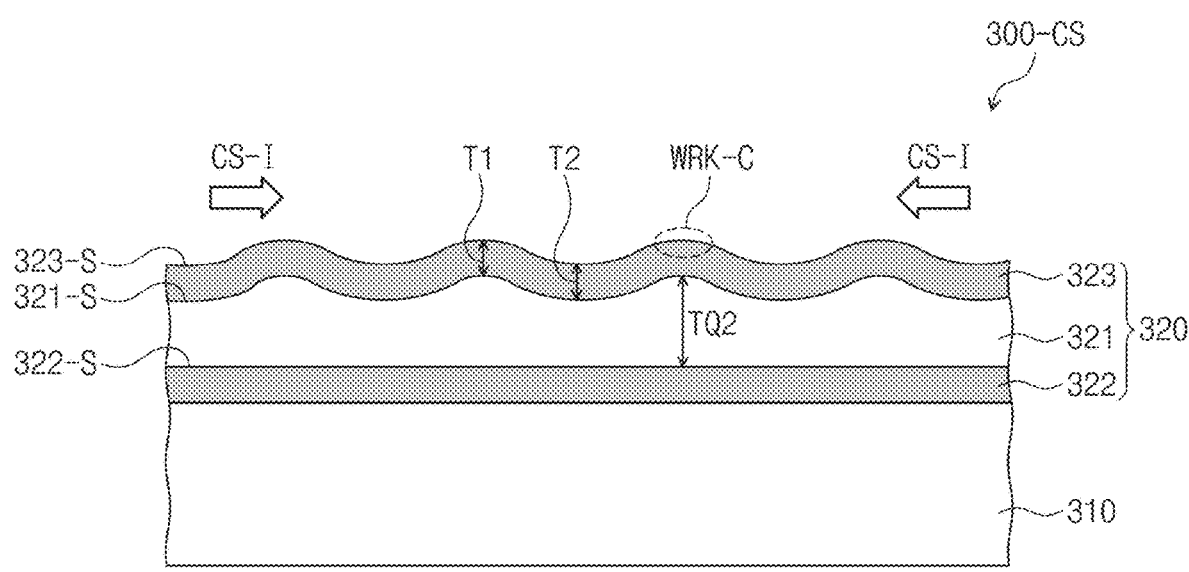

FIGS. 7A to 7C are cross-sectional views each illustrating an optical member according to exemplary embodiments. The optical members shown in FIGS. 7B and 7C exemplarily illustrate the optical member 300 of FIG. 7A deformed by an external impact or heat. Hereinafter, an optical member according to exemplary embodiments will be described with reference to FIGS. 7A to 7C.

As shown in FIG. 7A, the optical member 300 may include the base substrate 310 and the quantum dot unit 320. The UBL top surface 323-S may include wrinkles WRK. The upper barrier layer 323 may have a substantially uniform thickness. For example, the upper barrier layer 323 may have a thickness T1 on the wrinkles WRK and a thickness T2, which is substantially equal to T1, on regions adjacent to the wrinkles WRK. The quantum dot layer 321 may include a wrinkled top surface 321-S. Due to the presence of the wrinkles WRK, the quantum dot layer 321 may have a non-uniform thickness. The quantum dot layer 321 may have the largest thickness TQ below the wrinkles WRK.

Referring to FIG. 7B, when a tensile stress TS-I is exerted on an optical member 300-TS, the quantum dot layer 321 may be deformed. The extent of the wrinkle of the QDL top surface 321-S may be reduced, and the quantum dot layer 321 may have the largest thickness TQ1 less than the largest thickness TQ of FIG. 7A. The tensile stress TS-I may be caused by an external impact or by a residual stress, which may remain in the quantum dot layer 321.

Referring to FIG. 7C, when a compressive stress CS-I is exerted on an optical member 300-CS, the quantum dot layer 321 may be deformed. The extent of the wrinkle of the QDL top surface 321-S may be increased, and the quantum dot layer 321 may have the largest thickness TQ2 greater than the largest thickness TQ of FIG. 7A. The compressive stress CS-I may be caused by an external impact or by a residual stress, which may remain in the quantum dot layer 321.

In an exemplary embodiment, the upper barrier layer 323 may be formed to have a substantially uniform thickness along the uneven QDL top surface 321-S, and thus, the upper barrier layer 323 may be maintained to be in stable contact with the quantum dot layer 321, even when the extent of the wrinkle of the QDL top surface 321-S is changed. The extent of the wrinkles WRK-T and WRK-C of the UBL top surface 323-S may be decreased or increased by the deformation of the QDL top surface 321-S, however, in the optical member 300 of FIG. 7A, a position of a neutral plane of the upper barrier layer 323 may not be changed as the thickness of the upper barrier layer 323 is uniformly maintained.

As such, the upper barrier layer 323 may be stably maintained under the deformation of the QDL top surface 321-S, and thus, reliability of the optical member 300-TS may be improved.

Figure 8A:
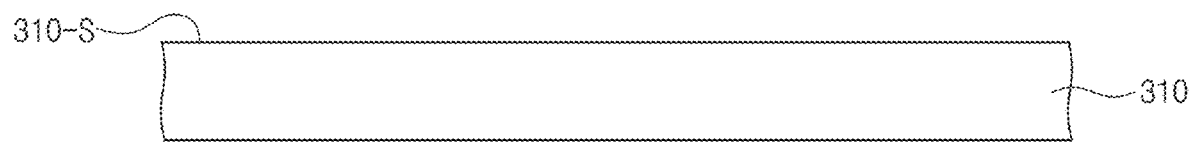
FIGS. 8A, 8B, 8C, 8D, and 8E are cross-sectional views illustrating a method of fabricating an optical member according to an exemplary embodiment.
Figure 8B:
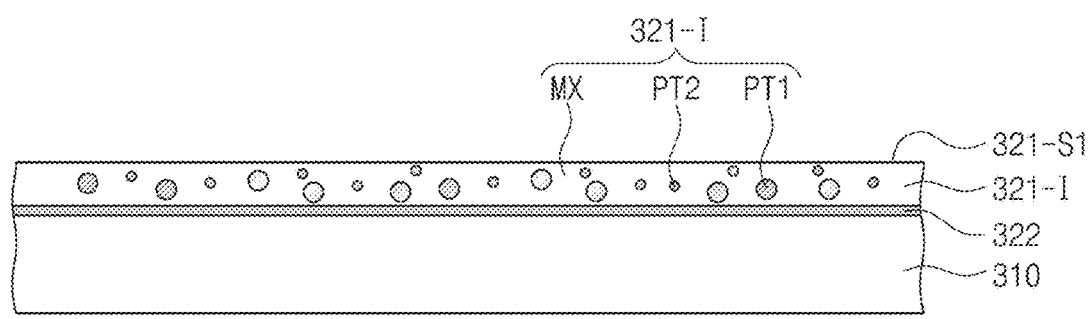
Figure 8C:
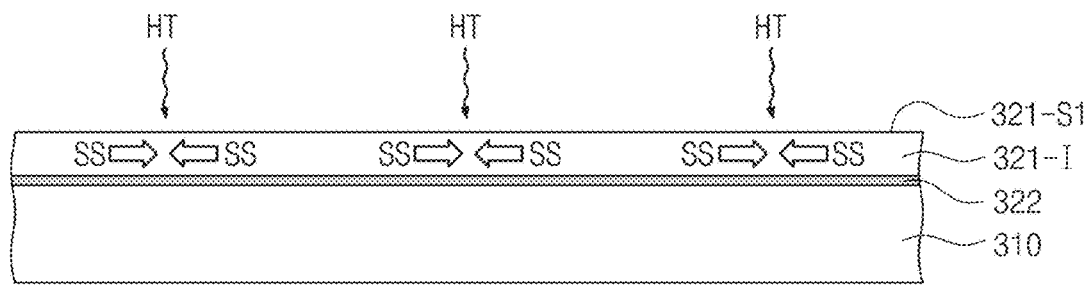
Figure 8D:
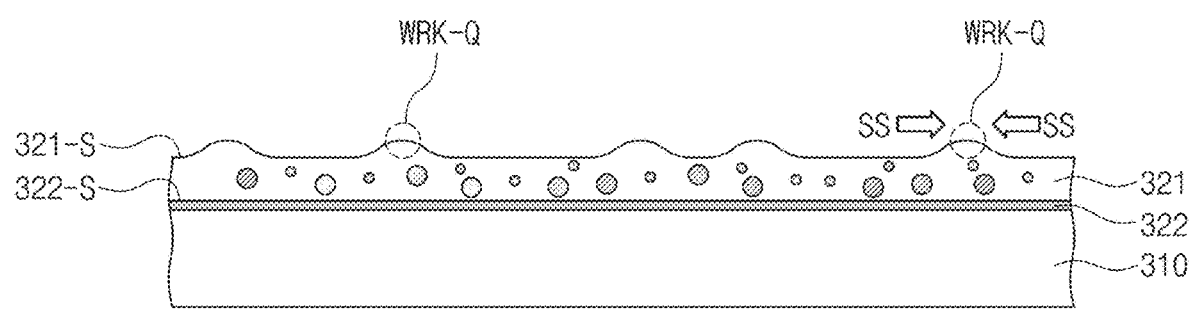
Figure 8E:
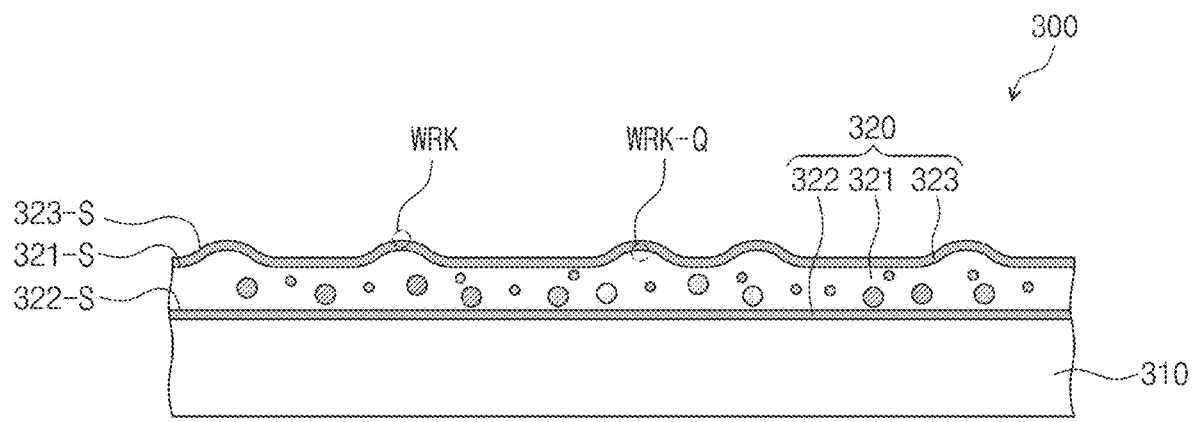
Figure 9A:
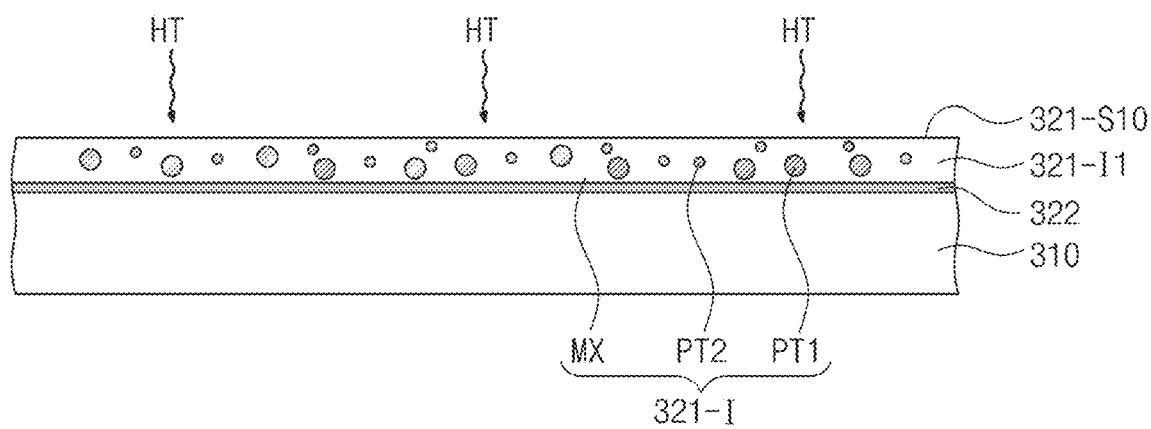
FIGS. 9A, 9B, 9C, and 9D are cross-sectional views illustrating a method of fabricating an optical member according to an exemplary embodiment.
Figure 9B:
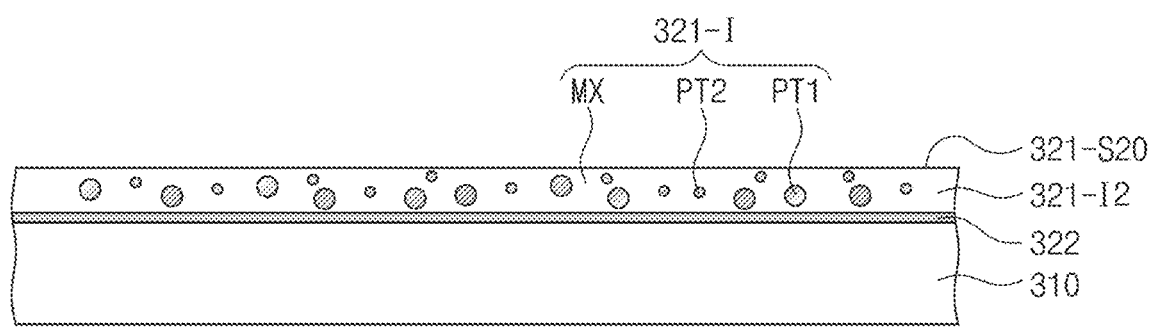
Figure 9C:
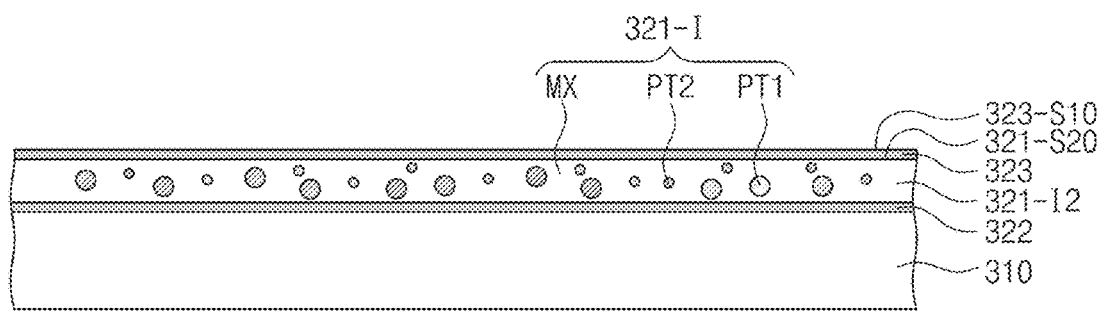

FIGS. 8A to 8E are cross-sectional views illustrating a method of fabricating an optical member according to an exemplary embodiment. FIGS. 9A to 9D are cross-sectional views illustrating a method of fabricating an optical member according to an exemplary embodiment. Steps corresponding to FIGS. 8C to 8E are illustrated in FIGS. 9A to 9C. Hereinafter, a method of fabricating an optical member according to exemplary embodiments will be described with reference to FIGS. 8A to 9C, and repeated descriptions to the substantially the same elements as those in the optical member previously described with reference to FIGS. 1 to 7C will be omitted to avoid redundancy.

As shown in FIG. 8A, the base substrate 310 may be provided. The base substrate 310 may be a glass substrate. The base substrate 310 may have the top surface 310-S facing toward an upward direction or the third direction DR3 (e.g., see FIG. 1).

Thereafter, as shown in FIG. 8B, the lower barrier layer 322 and a preliminary quantum dot layer 321-I may be sequentially formed on the base substrate 310. The lower barrier layer 322 may be formed by coating an inorganic material on the top surface 310-S of the base substrate 310, for example. The coating process may include a depositing or printing process.

The preliminary quantum dot layer 321-I may be formed after the formation of the lower barrier layer 322. The preliminary quantum dot layer 321-I may include the medium layer MX, the first quantum dot PT1, and the second quantum dot PT2. The preliminary quantum dot layer 321-I may be formed by coating the medium layer MX, in which the first quantum dot PT1 and the second quantum dot PT2 are dispersed, on the lower barrier layer 322.

Thereafter, as shown in FIGS. 8C and 8D, the preliminary quantum dot layer 321-I may be cured to form the quantum dot layer 321. As shown in FIG. 8C, the curing process of the preliminary quantum dot layer 321-I may include a thermal curing process, in which heat HT is provided. A process temperature or time in the thermal curing process may be variously adjusted, depending on a composition and an amount of the preliminary quantum dot layer 321-I and on a desired thickness of the quantum dot layer 321.

As shown in FIG. 8D, the quantum dot layer 321 may be formed to have wrinkles WRK-Q (hereinafter, "QDL wrinkles") on the top surface 321-S (hereinafter, a "QDL top surface"). After the curing process, the QDL top surface 321-S may have a wrinkled shape, compared to the LBL top surface 322-S.

The QDL wrinkles WRK-Q may be formed by a stress SS exerted on the top surface 321-S of the preliminary quantum dot layer 321-I. As a stronger stress SS is applied, the extent of the wrinkle of the QDL wrinkles WRK-Q may be formed greater. As the extent of the wrinkle of the QDL wrinkles WRK-Q becomes greater, the extent of the protrusion of the QDL wrinkles WRK-Q may become greater.

The extent of the wrinkle may be adjusted in various manners. For example, the extent of the wrinkle may vary depending on material characteristics of the preliminary quantum dot layer 321-I. In particular, the extent of the wrinkle may depend on a glass transition temperature of the preliminary quantum dot layer 321-I. As the stability of the preliminary quantum dot layer 321-I to the heat HT provided during the curing process becomes lower, the extent of the wrinkle may become greater.

In an exemplary embodiment, the extent of the wrinkle may vary depending on a thickness of the quantum dot layer 321. For example, a greater amount of the preliminary quantum dot layer 321-I may be provided to form a thicker preliminary quantum dot layer 321-I, and in this case, as the thickness of the quantum dot layer 321 becomes greater, the extent of the wrinkle may become greater.

In an exemplary embodiment, the extent of the wrinkle may vary depending on a difference in glass transition temperature between the base substrate 310 and the preliminary quantum dot layer 321-I. The stabilities of the base substrate 310 and the preliminary quantum dot layer 321-I to the heat HT provided during the curing process may be different from each other. As such, a residual stress may occur in the preliminary quantum dot layer 321-I, and when the residual stress is a compressive stress, the extent of the wrinkle may be increased.

Thereafter, as shown in FIG. 8E, the upper barrier layer 323 may be formed on the quantum dot layer 321 to form the optical member 300. The upper barrier layer 323 may be formed by coating an inorganic layer on the QDL top surface 321-S, for example. The coating process may include a depositing or printing process.

The upper barrier layer 323 may be formed to have a top surface 323-S (hereinafter, a "UBL top surface") wrinkled along the QDL top surface 321-S. The UBL top surface 323-S may have a vertical profile that is transcribed from the QDL top surface 321-S. As such, the UBL top surface 323-S may include a plurality of wrinkles WRK corresponding to the QDL wrinkles WRK-Q.

In the optical member 300 according to an exemplary embodiment, since the upper barrier layer 323 including an inorganic material is formed on the quantum dot layer 321 with the wrinkled top surface 321-S, the upper barrier layer 323 may be formed to have a wrinkled top surface 323-S. The deformation of the quantum dot layer 321 during a curing process may result from a thermal stress, such as heat HT. As such, by forming the quantum dot layer 321 with an uneven top surface 321-S according to an exemplary embodiment, the thermal stress caused by the heat HT may be relieved.

According to an exemplary embodiment, the upper barrier layer 323 may be directly formed on the deformed quantum dot layer 321, and thus, the quantum dot layer 321 may be suppressed or prevented from being deformed in a subsequent step. Furthermore, since the upper barrier layer 323 is formed along the wrinkle WRK-Q of the quantum dot layer 321, it may be possible to prevent or suppress damage or delamination issue from occurring in the upper barrier layer 323, even when the wrinkle WRK-Q is deformed by a subsequent deformation of the quantum dot layer 321.

Referring to FIGS. 9A to 9D, according to an exemplary embodiment, the QDL wrinkles WRK-Q and the wrinkles WRK of the UBL top surface may be formed at substantially the same time. As shown in FIGS. 9A and 9B, a first preliminary quantum dot layer 321-I1 may be cured to form a second preliminary quantum dot layer 321-I2. The first preliminary quantum dot layer 321-I1 may correspond to the preliminary quantum dot layer 321-I shown in FIG. 7C.

The second preliminary quantum dot layer 321-I2 may have a flat top surface 321-S20, unlike the quantum dot layer 321 of FIG. 8D formed by curing the first preliminary quantum dot layer 321-I1. A top surface 321-S10 of the first preliminary quantum dot layer 321-I1 may be substantially the same as the top surface 321-S20 of the second preliminary quantum dot layer 321-I2. In this case, although the second preliminary quantum dot layer 321-I2 may be exposed to a thermal stress caused by the heat HT, however, a top surface 321-S20 thereof may not be deformed from a top surface 321-S10 of the first preliminary quantum dot layer 321-I1.

Thereafter, as shown in FIG. 9C, a preliminary upper barrier layer 323-I may be formed on the second preliminary quantum dot layer 321-I2. The preliminary upper barrier layer 323-I may have a top surface 323-S10 having the profile transcribed from the top surface 321-S20 of the second preliminary quantum dot layer 321-I2. As such, the top surface 323-S10 of the preliminary upper barrier layer 323-I may be a substantially flat surface.

Figure 9D:
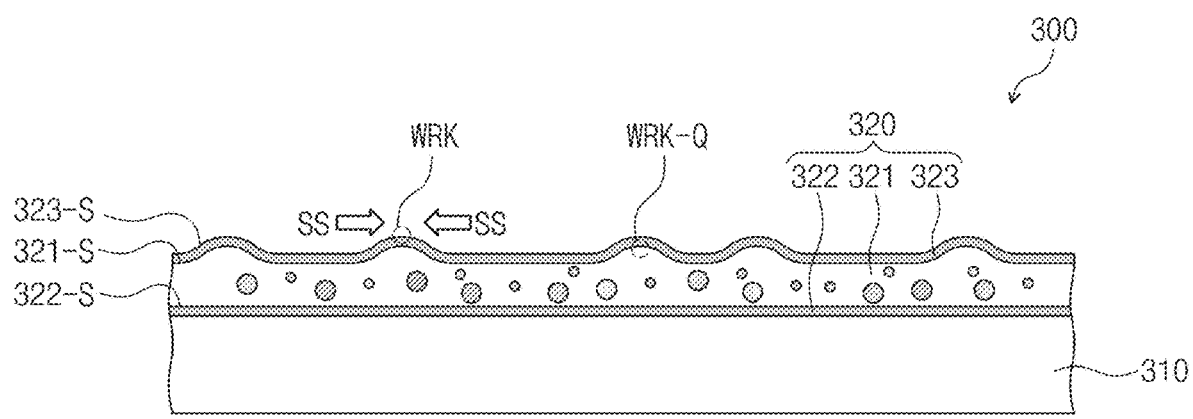

As shown in FIG. 9D, the second preliminary quantum dot layer 321-I2 and the preliminary upper barrier layer 323-I may be deformed to form the quantum dot layer 321 and the upper barrier layer 323. FIGS. 9C and 9D illustrate that the upper barrier layer 323 is deformed after the formation thereof, however, the inventive concepts are not limited thereto. For example, in some exemplary embodiments, the upper barrier layer 323 may be deformed during the formation thereof.

The quantum dot layer 321 may be formed as a result of the second preliminary quantum dot layer 321-I2 being deformed by a residual stress SS, such as a thermal stress from the heat HT. Due to the residual stress SS, the wrinkles WRK-Q and WRK may be formed on the QDL top surface 321-S and the top surface 323-S of the upper barrier layer 323, respectively. In an exemplary embodiment, the residual stress SS may be a compressive stress to the wrinkles WRK-Q and WRK.

According to an exemplary embodiment, since the upper barrier layer 323 may be directly formed on the deformed quantum dot layer 321, it may be possible to prevent or suppress the quantum dot layer 321 from being further deformed in a subsequent step. Furthermore, in an exemplary embodiment, since the upper barrier layer 323 is formed along the wrinkle WRK1 of the quantum dot layer 321, it may be possible to prevent or suppress damage or delamination issue from occurring in the upper barrier layer 323, even when the wrinkle WRK1 is deformed by subsequent deformation of the quantum dot layer 321.

Figure 10:
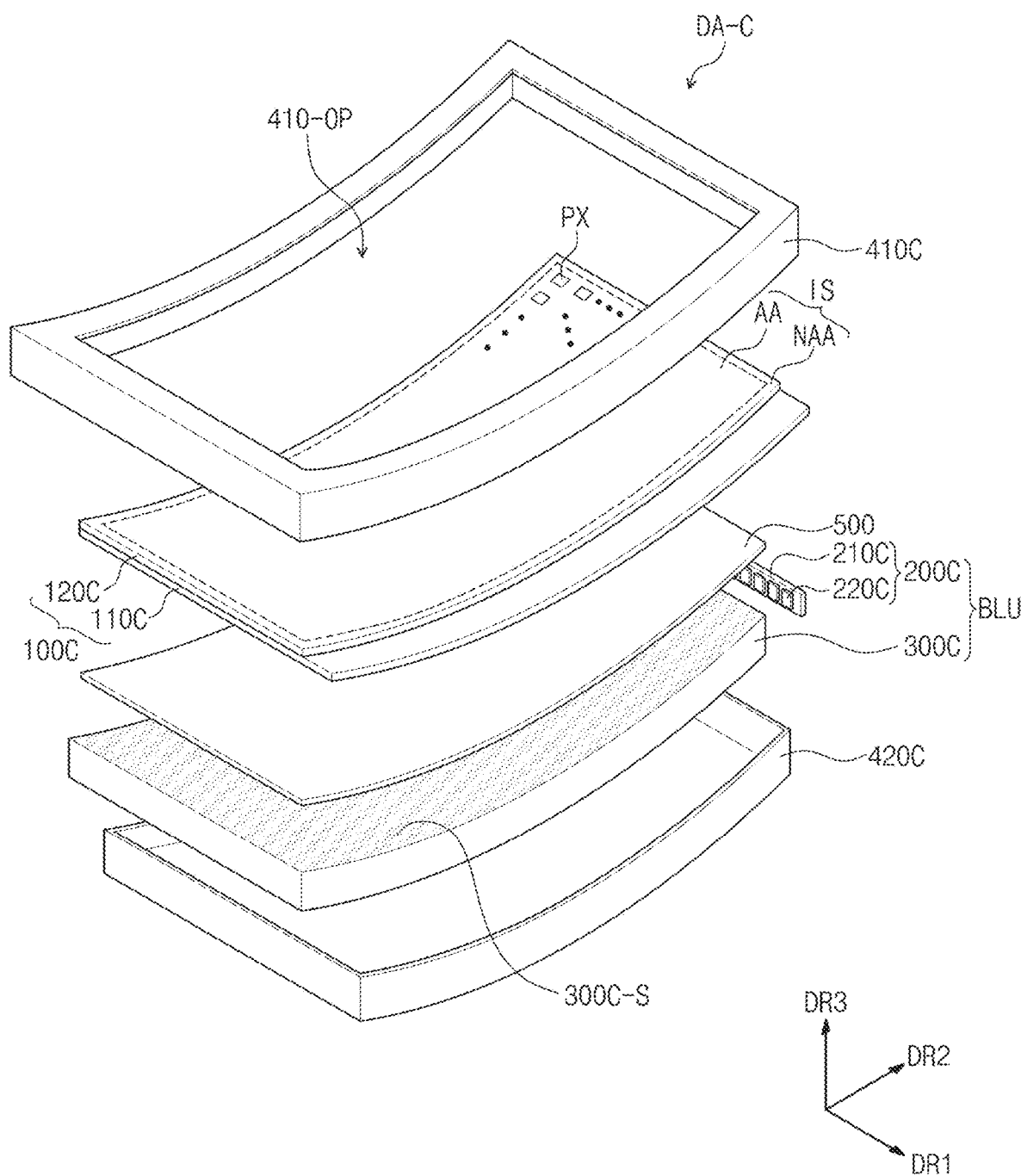
FIG. 10 is an exploded perspective view of a display apparatus according to an exemplary embodiment.

FIG. 10 is an exploded perspective view of a display apparatus according to an exemplary embodiment. FIGS. 11A to 11D are cross-sectional views illustrating a method of fabricating an optical member according to an exemplary embodiment. Hereinafter, a display apparatus according to an exemplary embodiment will be described with reference to FIGS. 10 to 11D.

As shown in FIG. 10, a display apparatus DA-C may have a curvilinear shape. The display apparatus DA-C may include a display panel 100C, a backlight unit BLU, an upper protection member 410C, a lower protection member 420C, and an optical film 500.

The display panel 100C may have a curvilinear shape. The display panel 100C may include a first substrate 110C and a second substrate 120C. Each of the first substrate 110C and the second substrate 120C may also have a curvilinear shape, and except for their curvilinear shapes, the first substrate 110C and the second substrate 120C may have substantially the same features as the first substrate 110 and the second substrate 120 of FIG. 1. As such, repeated descriptions of the substantially the same elements and features will be omitted.

Each of the upper protection member 410C and the lower protection member 420C may have a curvilinear shape. The optical film 500 may be in a curved state when assembled in the display apparatus DA-C. Except for the curvilinear shapes of the upper protection member 410C, the lower protection member 420C, and the optical film 500, they may have substantially the same features as the upper protection member 410, the lower protection member 420, and the optical film 500 of FIG. 1. As such, repeated descriptions of the substantially the same elements and features will be omitted.

The backlight unit BLU may include a light source 200C and an optical member 300C. The light source 200C may include a circuit substrate 210C and a plurality of light-emitting elements 220C. In an exemplary embodiment, the light source 200C may have substantially the same features as the light source 200 of FIG. 1, and thus, repeated descriptions thereof will be omitted to avoid redundancy.

The optical member 300C may have a curvilinear shape in a specific direction. The optical member 300C may be disposed such that a top surface 300C-S thereof faces the display panel 100C. Except for its curvilinear shape, the optical member 300C may correspond to the optical member 300 of FIG. 1. Hereinafter, the optical member 300C will be described in more detail with reference to FIGS. 11A to 11D.

Figure 11A:
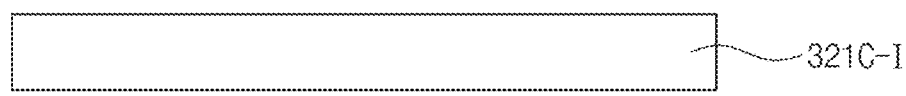
FIGS. 11A, 11B, 11C, and 11D are cross-sectional views illustrating a method of fabricating an optical member according to an exemplary embodiment.
Figure 11A:
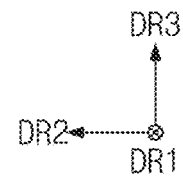
Figure 11B:
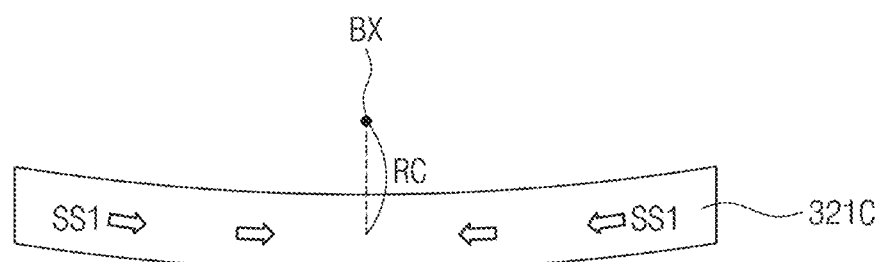
Figure 11B:
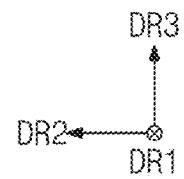

As shown in FIGS. 11A and 11B, a base substrate 312C with a curvilinear shape may be formed by bending a preliminary base substrate 312-I along a bending axis BX. As such, a stress SS1 may occur in the base substrate 312C. The stress SS1 may be a compressive stress. The base substrate 312C may be bent along the bending axis BX by the stress SS1.

The base substrate 312C may be bent with a curvature radius RC along the bending axis BX. Although FIG. 11B shows that the base substrate 312C is uniformly bent with a single curvature radius (e.g., the curvature radius RC), however, the inventive concepts are not limited thereto. For example, in some exemplary embodiments, the base substrate 312C may be bent with at least two different curvature radii.

Figure 11C:
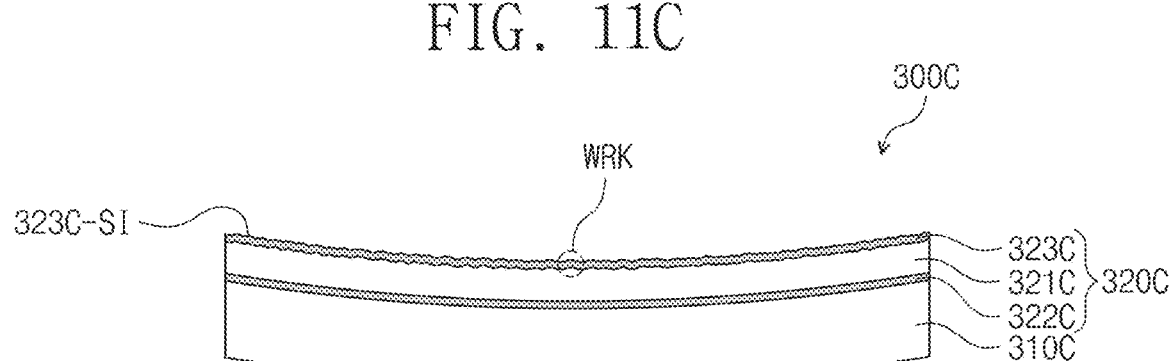
Figure 11C:
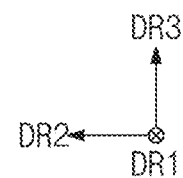

Thereafter, as shown in FIG. 11C, a lower barrier layer 322C, a quantum dot layer 321C, and an upper barrier layer 323C may be sequentially formed on a base substrate 310C to form the optical member 300C. Wrinkles WRK may be formed on a top surface of the upper barrier layer 323C. As described above, the wrinkles WRK may be formed when the quantum dot layer 321C is cured, or may be formed by wrinkles formed when the upper barrier layer 323C is formed, and thus, repeated descriptions thereof will be omitted.

Figure 11D:
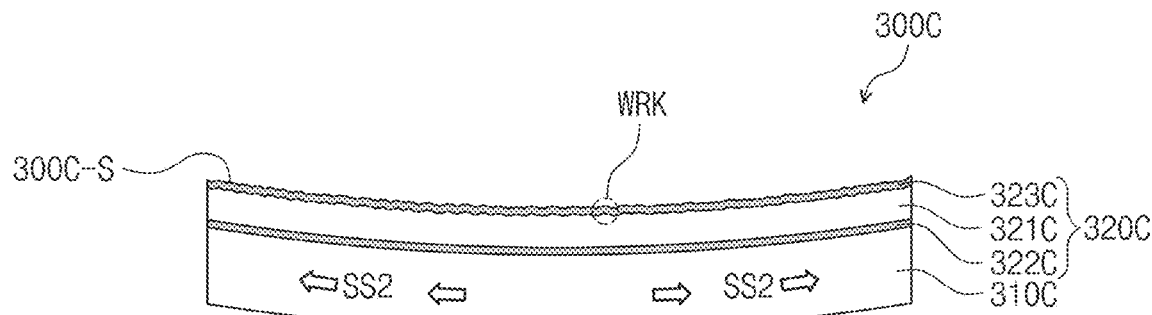
Figure 11D:
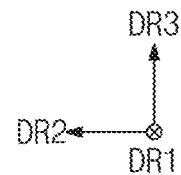

As shown in FIG. 11D, a stress SS2 may occur in the base substrate 310C after the formation of the optical member 300C. The stress SS2 may be a residual stress of the base substrate 310C and may be a tensile stress. The residual stress may be caused by a bending stress exerted on the base substrate 310C.

In an exemplary embodiment, due to the UBL top surface 323C-S with the wrinkles WRK, an adhesion strength between the upper barrier layer 323C and the quantum dot layer 321C may be stably maintained, even when the quantum dot layer 321C and so forth are deformed by the stress SS2. Thus, it may be possible to prevent or suppress the upper barrier layer 323C from being delaminated from the quantum dot layer 321C or from being broken, thereby improving the reliability of the optical member 300C.

According to exemplary embodiments of the inventive concept, an inorganic barrier layer covering a quantum dot layer may be formed to have wrinkles. Accordingly, even when the quantum dot layer is deformed by a thermal stress or an external impact, the inorganic barrier layer may be suppressed or prevented from being damaged, and thus, the reliability of an optical member may be improved.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An optical member, comprising:
   a base substrate;
   a quantum dot layer disposed on the base substrate and having a first top surface including a lower wrinkle, the quantum dot layer comprising a medium layer and a plurality of quantum dots dispersed in the medium layer;
   a lower barrier layer disposed between the base substrate and the quantum dot layer and having a substantially flat top surface; and
   an upper barrier layer covering the first top surface of the quantum dot layer,
   wherein the upper barrier layer has a second top surface with an upper wrinkle corresponding to the lower wrinkle of the quantum dot layer.

2. The optical member of claim 1, wherein the upper barrier layer has a uniform thickness on the base substrate.

3. The optical member of claim 2, wherein the quantum dot layer has a varying thickness on the base substrate.

4. The optical member of claim 2, wherein the upper barrier layer comprises an inorganic layer.

5. The optical member of claim 1, wherein:
   the upper wrinkle is provided in plural on the second top surface; and
   at least one of the plurality of upper wrinkles has a curvilinear shape, when viewed in a plan view.

6. The optical member of claim 5, wherein at least two of the upper wrinkles are connected to each other.

7. The optical member of claim 5, wherein the curvilinear shape includes a closed loop shape.

8. The optical member of claim 7, wherein the upper wrinkles comprise a first wrinkle having a first closed loop shape and a second wrinkle having a second closed loop shape different from the first closed loop shape.

9. The optical member of claim 8, wherein the first wrinkle and the second wrinkle are connected to each other.

10. The optical member of claim 5, wherein each of the upper wrinkles has a vertical thickness of about 1 μm or less.

11. The optical member of claim 10, wherein a distance between the upper wrinkles is less than 100 μm.

12. The optical member of claim 1, further comprising a low refraction layer disposed between the base substrate and the lower barrier layer, and having a refractive index of 1.5 or less.

13. The optical member of claim 12, wherein the base substrate comprises a glass substrate.

14. The optical member of claim 12, further comprising a protection layer including an organic material and disposed on the upper barrier layer,
wherein the protection layer covers the second top surface and has a flat top surface.

15. A display apparatus, comprising:
a light source configured to emit light;
an optical member having an incidence surface facing the light source; and
a display panel disposed on the optical member and comprising a plurality of pixels,
wherein the optical member comprises:
a base substrate including a top surface facing the display panel, a bottom surface opposite to the top surface, and a plurality of side surfaces connecting the top surface to the bottom surface, at least one of the side surfaces comprising the incidence surface;
a lower barrier layer disposed on the base substrate, the lower barrier layer having a flat top surface;
an upper barrier layer disposed on the lower barrier layer, the upper barrier layer having a wrinkled top surface with a plurality of wrinkles formed thereon; and
a quantum dot layer disposed between the lower barrier layer and the upper barrier layer, the quantum dot layer including a medium layer and a plurality of quantum dots dispersed in the medium layer,
wherein the wrinkles have a curvilinear shape, when viewed in a plan view.

16. The display apparatus of claim 15, wherein the wrinkles comprise a first wrinkle having a first shape and a second wrinkle having a second shape different from the first shape, when viewed in a plan view.

17. The display apparatus of claim 16, wherein the first wrinkle and the second wrinkle are connected to each other.

18. The display apparatus of claim 15, wherein a top surface of the medium layer has a wrinkled shape different from a shape of the top surface of the base substrate.

19. The display apparatus of claim 18, wherein:
the medium layer has a non-uniform thickness on the base substrate; and
the upper barrier layer has a uniform thickness on the base substrate.

20. The display apparatus of claim 18, wherein the upper barrier layer comprises an inorganic layer.

21. The display apparatus of claim 15, wherein the base substrate comprises a glass substrate.

22. The display apparatus of claim 21, further comprising a low refraction layer disposed between the base substrate and the quantum dot layer, and having a refractive index less than 1.5.

23. The display apparatus of claim 15, further comprising a protection layer disposed on the upper barrier layer and covering the top surface of the upper barrier layer,
wherein the protection layer has a flat top surface having a shape different from that of the top surface of the upper barrier layer.

24. The display apparatus of claim 15, wherein the display panel is bent along an axis extended in one direction.

* * * * *